United States Patent
Mutoh et al.

(10) Patent No.: US 10,235,210 B2
(45) Date of Patent: Mar. 19, 2019

(54) OPERATION MANAGEMENT METHOD AND OPERATION MANAGEMENT APPARATUS

(71) Applicant: FUJITSU LIMITED, Kawasaki-shi, Kanagawa (JP)

(72) Inventors: Takeya Mutoh, Akashi (JP); Tokutomi Nagao, Tsushima (JP); Toshihide Miyagi, Kawasaki (JP); Yuta Kiyoumi, Yokohama (JP); Hiroyuki Fujie, Yokohama (JP); Akiko Matsumoto, Yokohama (JP); Shunichi Obinata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 15/091,841

(22) Filed: Apr. 6, 2016

(65) Prior Publication Data

US 2016/0299789 A1  Oct. 13, 2016

(30) Foreign Application Priority Data

Apr. 10, 2015 (JP) ................. 2015-080722

(51) Int. Cl.
    *G06F 9/46* (2006.01)
    *G06F 9/50* (2006.01)

(52) U.S. Cl.
    CPC ................. *G06F 9/5066* (2013.01)

(58) Field of Classification Search
    CPC .......... G06F 9/5066; G06F 9/485; G06F 9/50; G06F 9/5011; G06F 9/4881
    See application file for complete search history.

(56) References Cited

U.S. PATENT DOCUMENTS

| | | | | |
|---|---|---|---|---|
| 6,895,573 B2 * | 5/2005 | Nørgaard | ............... | G06Q 10/10 706/47 |
| 7,502,747 B1 * | 3/2009 | Pardo | ............... | G06Q 10/06 705/7.13 |

(Continued)

FOREIGN PATENT DOCUMENTS

| | | |
|---|---|---|
| JP | 2005-332025 | 12/2005 |
| JP | 2006-277696 | 10/2006 |

(Continued)

OTHER PUBLICATIONS

Notification of Reasons for Refusal for Japanese Application No. 2015-080722 dated Dec. 4, 2018.

*Primary Examiner* — Hiren P Patel
(74) *Attorney, Agent, or Firm* — Staas & Halsey LLP

(57) ABSTRACT

An operation management apparatus includes a storage unit and a processor. The storage unit stores therein operation scenario execution information including a first operation scenario and parallel execution information. The first operation scenario indicates an order of execution of a plurality of operation manipulations for a plurality of servers. The parallel execution information indicates whether the respective operation manipulations are to be executed in parallel with another operation manipulation. The processor acquires availability information indicating whether the respective servers are available. The processor generates execution determination information on basis of the operation scenario execution information when the availability information indicates existence of an unavailable server. The execution determination information indicates whether respective first operation manipulations are to be actually executed in execution of the first operation scenario. The first operation (Continued)

manipulations are indicated by the parallel execution information as to be executed in parallel with another operation manipulation.

5 Claims, 21 Drawing Sheets

(56) References Cited

U.S. PATENT DOCUMENTS

| | | | | |
|---|---|---|---|---|
| 8,103,713 | B2* | 1/2012 | Khodabakchian | G06F 9/5038 709/201 |
| 8,225,300 | B1* | 7/2012 | Webb | G06F 9/5027 717/149 |
| 8,504,400 | B2* | 8/2013 | Purcell | G06F 9/5072 705/7.11 |
| 8,583,467 | B1* | 11/2013 | Morris | G06Q 10/06 705/7.22 |
| 8,868,441 | B2* | 10/2014 | Bobak | G06Q 10/0633 705/7.27 |
| 9,037,921 | B1* | 5/2015 | Brooker | G06F 12/02 714/47.1 |
| 2003/0131146 | A1* | 7/2003 | Lam | G06F 9/45512 719/320 |
| 2003/0233374 | A1* | 12/2003 | Spinola | G06Q 10/02 |
| 2005/0028073 | A1* | 2/2005 | Henry | G06Q 10/10 715/255 |
| 2005/0283786 | A1* | 12/2005 | Dettinger | G06Q 10/0633 718/104 |
| 2006/0005140 | A1* | 1/2006 | Crew | G06Q 10/06 715/760 |
| 2006/0184945 | A1 | 8/2006 | Murase et al. | |
| 2006/0224428 | A1* | 10/2006 | Schmidt | G06Q 10/06 705/7.11 |
| 2008/0092140 | A1* | 4/2008 | Doninger | G06F 9/5038 718/102 |
| 2009/0171708 | A1* | 7/2009 | Bobak | G06Q 10/06 705/7.27 |
| 2009/0171733 | A1* | 7/2009 | Bobak | G06Q 10/06 705/80 |
| 2009/0172670 | A1* | 7/2009 | Bobak | G06F 8/30 718/100 |
| 2009/0198548 | A1* | 8/2009 | Kohler | G06Q 10/06 705/7.27 |
| 2009/0260017 | A1* | 10/2009 | Yoshida | G06F 9/5038 718/105 |
| 2010/0131792 | A1* | 5/2010 | Herrod | G06F 11/0742 714/2 |
| 2011/0029977 | A1* | 2/2011 | Ramanathaiah | G06F 9/5038 718/102 |
| 2011/0078426 | A1* | 3/2011 | Stoitsev | G06F 8/10 712/244 |
| 2011/0238458 | A1* | 9/2011 | Purcell | G06F 9/5072 705/7.27 |
| 2011/0246998 | A1* | 10/2011 | Vaidya | G06F 9/4881 718/103 |
| 2012/0079409 | A1* | 3/2012 | Luo | G06F 8/34 715/772 |
| 2014/0067804 | A1* | 3/2014 | Yoshizawa | G06F 17/30595 707/736 |
| 2014/0156849 | A1* | 6/2014 | Kim | G06F 9/5066 709/226 |
| 2015/0309769 | A1* | 10/2015 | Greene | G06Q 10/06 717/104 |
| 2016/0056879 | A1* | 2/2016 | Shimomoto | H04W 12/08 370/315 |
| 2017/0032000 | A1* | 2/2017 | Sharma | G06F 17/30557 |

FOREIGN PATENT DOCUMENTS

| | | |
|---|---|---|
| JP | 2012-10151 | 1/2012 |
| JP | 2013-8178 | 1/2013 |

* cited by examiner

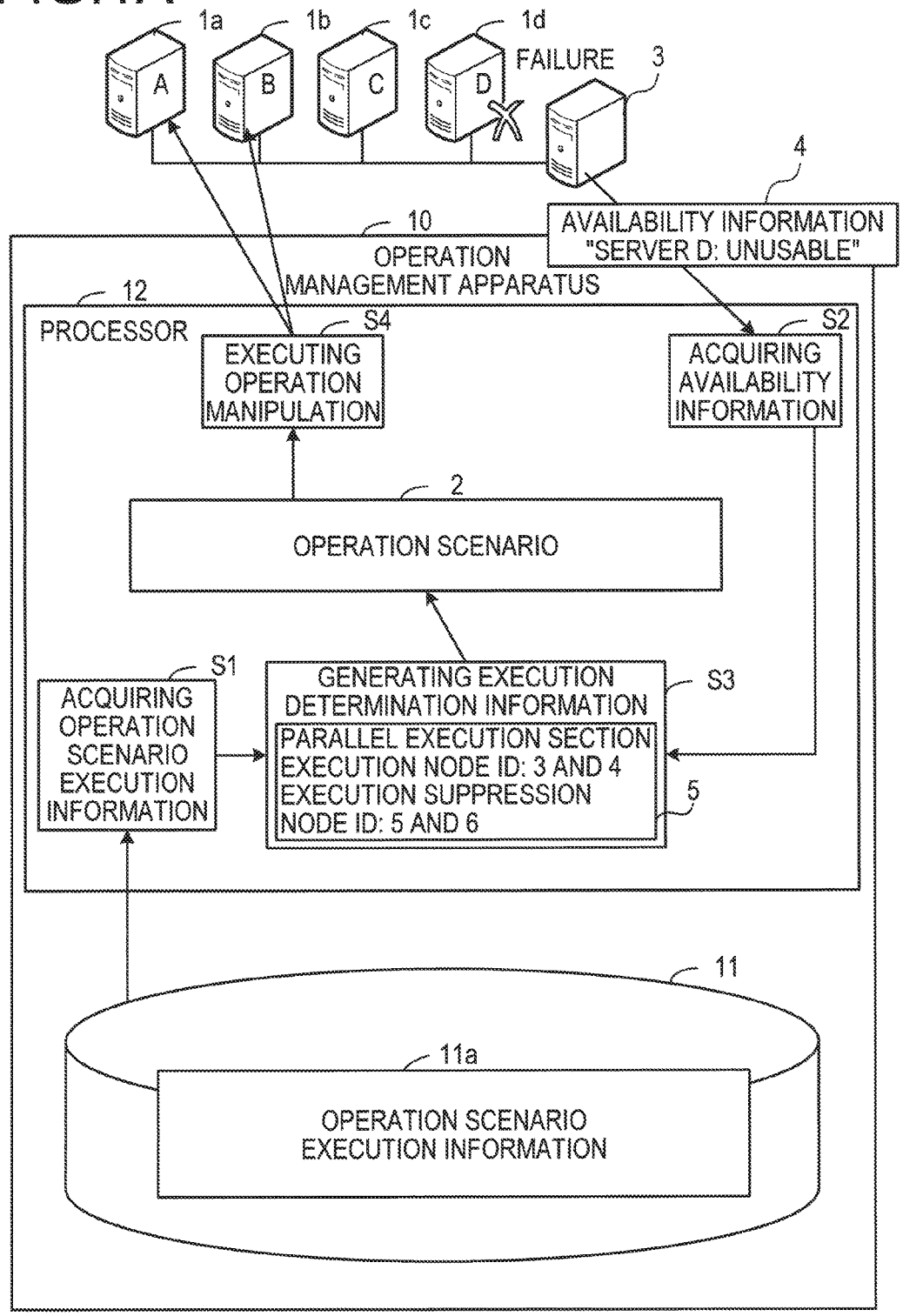

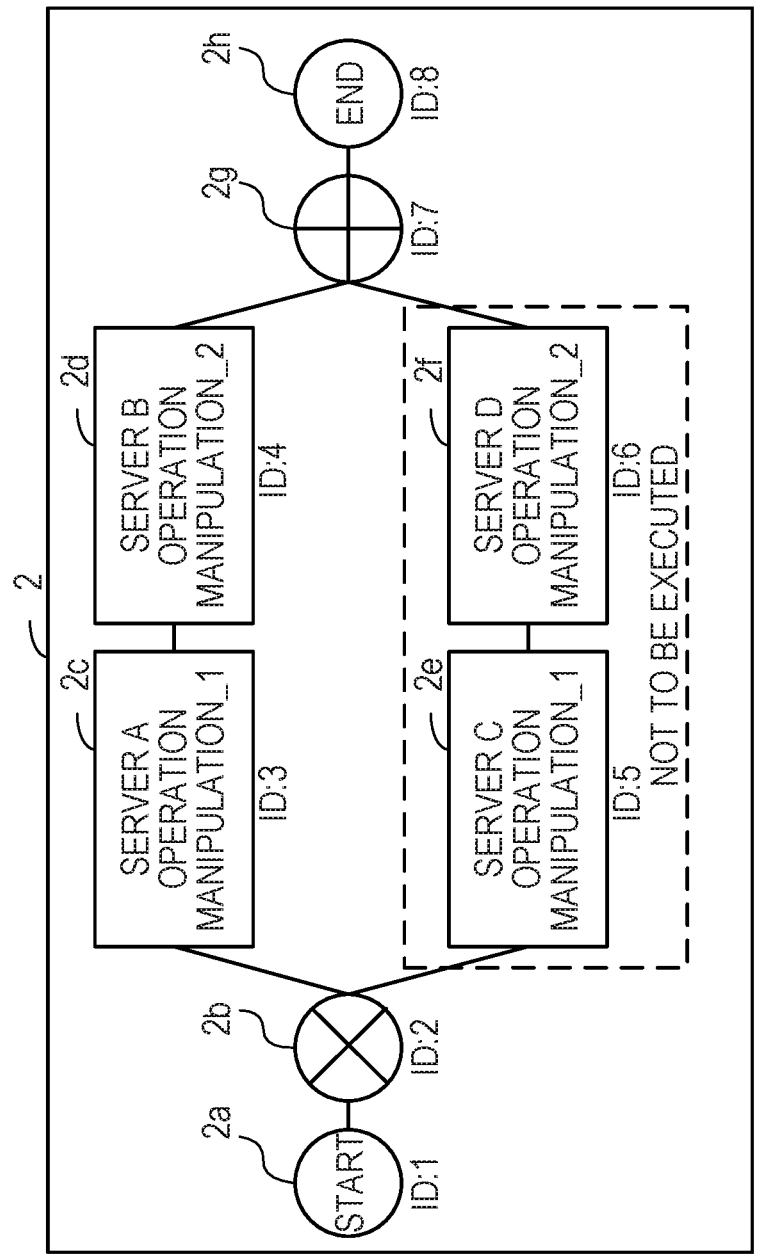

FIG. 1C

| NODE NAME | TARGET SERVER | NODE ID | ANT. NODE ID LIST | SUB. NODE ID LIST | PARALLEL EXECUTION INFORMATION |
|---|---|---|---|---|---|
| START | NULL | 1 | NULL | 2 | NON-PARALLEL |
| PARALLEL EXECUTION START | NULL | 2 | 1 | 3,5 | NON-PARALLEL |
| OPERATION MANIPULATION_1 | SERVER A | 3 | 2 | 4 | PARALLEL |
| OPERATION MANIPULATION_2 | SERVER B | 4 | 3 | 7 | PARALLEL |
| OPERATION MANIPULATION_1 | SERVER C | 5 | 2 | 6 | PARALLEL |
| OPERATION MANIPULATION_2 | SERVER D | 6 | 5 | 7 | PARALLEL |
| PARALLEL EXECUTION END | NULL | 7 | 3,5 | 8 | NON-PARALLEL |
| END | NULL | 8 | 7 | NULL | NON-PARALLEL |

PROCESS DEFINITION ID: 1                                                                                  121a

| NODE NAME | TARGET SERVER | NODE ID | ANT. NODE ID LIST | SUB. NODE ID LIST | PARALLEL EXECUTION START NODE ID | PARALLEL EXECUTION END NODE ID | STATUS |
|---|---|---|---|---|---|---|---|
| START | NULL | 1 | NULL | 2 | NULL | NULL | WAITING |
| PARALLEL EXECUTION START | NULL | 2 | 1 | 3,6,9 | NULL | NULL | WAITING |
| SERVICE STOP | SERVER A | 3 | 2 | 4 | 2 | 12 | WAITING |
| BACKUP | SERVER A | 4 | 3 | 5 | 2 | 12 | WAITING |
| SERVICE START | SERVER A | 5 | 4 | 12 | 2 | 12 | WAITING |
| SERVICE STOP | SERVER B | 6 | 2 | 7 | 2 | 12 | WAITING |
| BACKUP | SERVER B | 7 | 6 | 8 | 2 | 12 | WAITING |
| SERVICE START | SERVER B | 8 | 7 | 12 | 2 | 12 | WAITING |
| SERVICE STOP | SERVER C | 9 | 2 | 10 | 2 | 12 | WAITING |
| BACKUP | SERVER C | 10 | 9 | 11 | 2 | 12 | WAITING |
| SERVICE START | SERVER C | 11 | 10 | 12 | 2 | 12 | WAITING |
| PARALLEL EXECUTION END | NULL | 12 | 5,8,11 | 13 | NULL | NULL | WAITING |
| END | NULL | 13 | 12 | NULL | NULL | NULL | WAITING |

FIG.8

| PROCESS DEFINITION ID | EXECUTION START DATE AND TIME | EXECUTION RESULT |
|---|---|---|
| 1 | 2015/02/16 23:00 | UNEXECUTED |
| 1-1 | - | UNEXECUTED |
| 1-2 | - | UNEXECUTED |
| ⋮ | ⋮ | ⋮ |

FIG. 16

PROCESS DEFINITION ID: 2　121b

| | TARGET SERVER | NODE ID | ANT. NODE ID LIST | SUB. NODE ID LIST | PARALLEL EXECUTION START NODE ID | PARALLEL EXECUTION END NODE ID | STATUS |
|---|---|---|---|---|---|---|---|
| START | NULL | 1 | NULL | 2 | NULL | NULL | COMPLETED |
| TRANSMISSION OF E-MAIL TO ADMINISTRATOR | NULL | 2 | 1 | 3 | NULL | NULL | EXECUTING |
| PARALLEL EXECUTION START | NULL | 3 | 2 | 4,7,10 | NULL | NULL | WAITING |
| SERVICE STOP | SERVER A | 4 | 3 | 5 | 3 | 13 | WAITING |
| BACKUP | SERVER A | 5 | 4 | 6 | 3 | 13 | WAITING |
| SERVICE START | SERVER A | 6 | 5 | 13 | 3 | 13 | WAITING |
| SERVICE STOP | SERVER B | 7 | 3 | 8 | 3 | 13 | WAITING |
| BACKUP | SERVER B | 8 | 7 | 9 | 3 | 13 | WAITING |
| SERVICE START | SERVER B | 9 | 8 | 13 | 3 | 13 | WAITING |
| SERVICE STOP | SERVER C | 10 | 3 | 11 | 3 | 13 | WAITING |
| BACKUP | SERVER C | 11 | 10 | 12 | 3 | 13 | WAITING |
| SERVICE START | SERVER C | 12 | 11 | 13 | 3 | 13 | WAITING |
| PARALLEL EXECUTION END | NULL | 13 | 6,9,12 | 14 | NULL | NULL | WAITING |
| END | NULL | 14 | 13 | NULL | NULL | NULL | WAITING |

FIG. 18

PROCESS DEFINITION ID: 2-1    121c

| NODE NAME | TARGET SERVER | NODE ID | ANT. NODE ID LIST | SUB. NODE ID LIST | PARALLEL EXECUTION START NODE ID | PARALLEL EXECUTION END NODE ID | STATUS |
|---|---|---|---|---|---|---|---|
| START | NULL | 1 | NULL | 2 | NULL | NULL | COMPLETED |
| TRANSMISSION OF E-MAIL TO ADMINISTRATOR | NULL | 2 | 1 | 3 | NULL | NULL | EXECUTING |
| PARALLEL EXECUTION START | NULL | 3 | 2 | 4,7 | NULL | NULL | WAITING |
| SERVICE STOP | SERVER A | 4 | 3 | 5 | 3 | 13 | WAITING |
| BACKUP | SERVER A | 5 | 4 | 6 | 3 | 13 | WAITING |
| SERVICE START | SERVER A | 6 | 5 | 13 | 3 | 13 | WAITING |
| SERVICE STOP | SERVER B | 7 | 3 | 8 | 3 | 13 | WAITING |
| BACKUP | SERVER B | 8 | 7 | 9 | 3 | 13 | WAITING |
| SERVICE START | SERVER B | 9 | 8 | 13 | 3 | 13 | WAITING |
| PARALLEL EXECUTION END | NULL | 13 | 6,9 | 14 | NULL | NULL | WAITING |
| END | NULL | 14 | 13 | NULL | NULL | NULL | WAITING |

OPERATION MANAGEMENT METHOD AND OPERATION MANAGEMENT APPARATUS

CROSS-REFERENCE TO RELATED APPLICATION

This application is based upon and claims the benefit of priority from the prior Japanese Patent Application No. 2015-080722, filed on Apr. 10, 2015, the entire contents of which are incorporated herein by reference.

FIELD

The embodiments discussed herein are related to an operation management method and an operation management apparatus.

BACKGROUND

In the operation of a computer system, a variety of manipulations are executed for servers in the computer system. Examples of such manipulations may include backup of data in a server and update of programs installed in a server, etc. For a large-scaled computer system, it is difficult for an administrator to manually execute all manipulations (hereinafter referred to as operation manipulations) occurring during the system operation.

For example, an operation scenario is generated for automatically executing the operation manipulations. The operation scenario is, for example, information defining an order of execution of the operation manipulations. When the operation scenario is generated in advance, it is possible to automatically execute the operation manipulations in accordance with the generated operation scenario. For example, an incident management system for automatically coping with known incidents is being under consideration.

When a server to be manipulated has a trouble, there are some cases where manipulations are unable to be executed in accordance with the operation scenario. As measures against such cases, for example, a technique for generating an interruption scenario for interrupting execution of the operation scenario is being under consideration.

Related techniques are disclosed in, for example, Japanese Laid-Open Patent Publication No. 2013-008178 and Japanese Laid-Open Patent Publication No. 2005-332025.

As for the methods for generating an operation scenario applied to a plurality of servers, for example, a method for individually generating operation scenarios related to operation manipulations for individual servers is considered. In this method, the operation scenarios are generated individually every time the number of servers is changed, which may result in an imposition of excessive burden for generating operation scenarios on an administrator under current situations where the number of servers may be easily changed by using a virtual machine.

In order to reduce the burden for generating operation scenarios, an operation scenario for collectively executing operation manipulations for a plurality of servers may be generated. Accordingly, it may be possible to decrease the number of operation scenarios to be generated and thus alleviate the burden for generating operation scenarios imposed on the administrator.

However, conventionally, when an abnormality occurs in some servers in the collective execution of the operation manipulations according to the operation scenario for the plurality of servers, it is not possible to determine the range of influence by the abnormality. Therefore, the execution of the entire operation scenario is stopped even by an abnormality in some servers, which makes it impossible to execute operation manipulations for the servers that are not directly related to the abnormality. Such use of the operation scenario for collectively executing operation manipulations for the plurality of servers may result in stoppage of all operation manipulations in the operation scenario due to the abnormality of some servers and reduction of efficiency of execution of operation manipulations.

SUMMARY

According to an aspect of the present invention, provided is an operation management apparatus including a storage unit and a processor. The storage unit is configured to store therein operation scenario execution information including a first operation scenario and parallel execution information. The first operation scenario indicates an order of execution of a plurality of operation manipulations for a plurality of servers. The parallel execution information indicates whether the respective operation manipulations are to be executed in parallel with another operation manipulation. The processor is configured to acquire availability information indicating whether the respective servers are available. The processor is configured to generate execution determination information on basis of the operation scenario execution information when the availability information indicates existence of an unavailable server. The execution determination information indicates whether respective first operation manipulations are to be actually executed in execution of the first operation scenario. The first operation manipulations are indicated by the parallel execution information as to be executed in parallel with another operation manipulation.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 1A to 1C are diagrams illustrating an exemplary configuration of a system according to a first embodiment;

FIG. 7 is a diagram illustrating an example of process definition information;

FIG. 8 is a diagram illustrating an example of schedule information;

FIG. 16 is a diagram illustrating an example of process definition information indicating a process definition under execution when abnormality is detected;

FIG. 18 is a diagram illustrating an example of process definition information indicating an alternate process definition.

DESCRIPTION OF EMBODIMENTS

Figure 2:
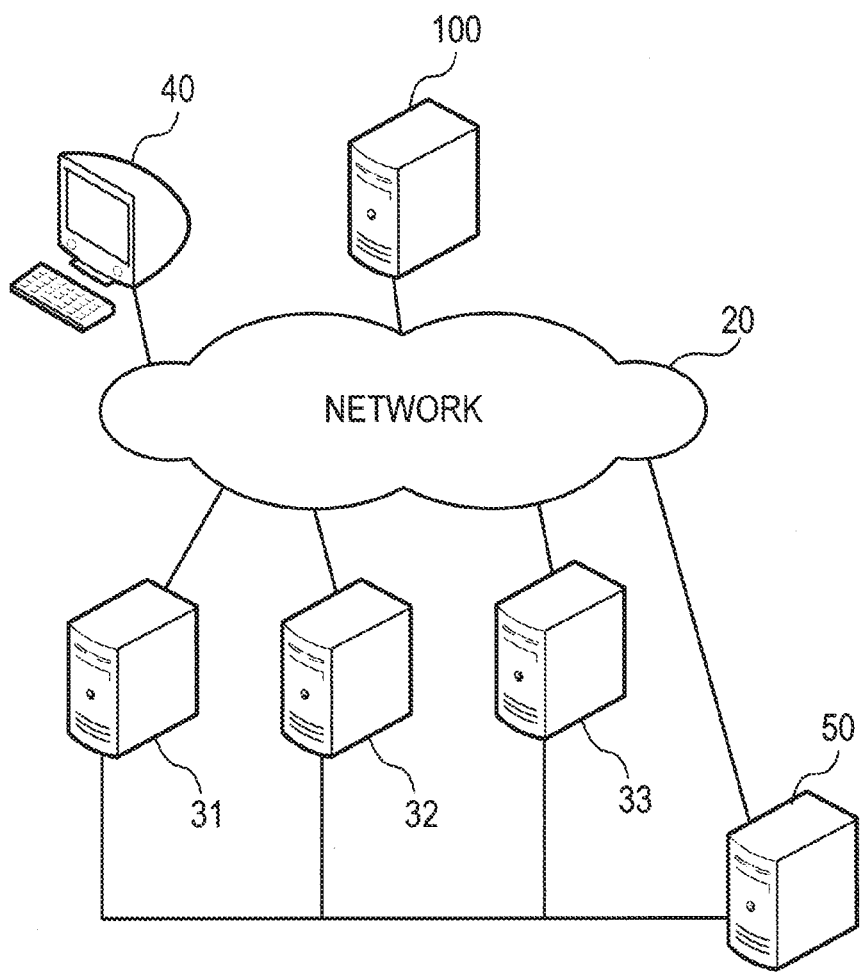
FIG. 2 is a diagram illustrating an exemplary configuration of a system according to a second embodiment.

Hereinafter, embodiments will be described with reference to the drawings. The embodiments may be combined with each other as long as there is no contradictory.

First Embodiment

FIGS. 1A to 1C are diagrams illustrating an exemplary configuration of a system according to a first embodiment. An operation management apparatus 10 executes operation manipulations for a plurality of servers 1a to 1d in accordance with an operation scenario 2. The operation scenario 2 defines an order of execution of the operation manipulations for the servers 1a to 1d. Here, the servers 1a to 1d are referred to as a "server A", a "server B", a "server C", and a "server D", respectively. Examples of the operation manipulations may include backup of data of the servers 1a to 1d, update of software, setting of operation environment for software, and so on. In the operation scenario 2, for example, operation manipulations are represented by nodes 2a to 2h. The nodes 2a to 2h include a start node 2a and an end node 2h. The antecedent dependency in execution order is indicated by connection lines between the nodes 2a to 2h. The nodes 2a to 2h are assigned with their respective node identifiers (IDs). In FIG. 1B, the node IDs are illustrated below the respective nodes 2a to 2h.

A monitoring device 3 monitors the status of the servers 1a to 1d. For example, the monitoring device 3 sends a predetermined command to the servers 1a to 1d regularly and checks whether or not the respective servers is to 1d are normally operating, according to whether an acknowledgement to the command is present or not.

The operation management apparatus 10 includes a storage unit 11 and a processor 12. The storage unit 11 stores therein operation scenario execution information 11a. The operation scenario execution information 11a contains the operation scenario 2 and parallel execution information indicating whether or not a plurality of operation manipulations in the operation scenario 2 are to be executed in parallel. In the operation scenario execution information 11a, for example, the operation scenario 2 is defined with a node name, a target server, a node ID, an antecedent node ID list ("ANT. NODE ID LIST" in the drawings) and a subsequent node ID list ("SUB. NODE ID LIST" in the drawings). The node name is a name of a relevant node. The target server is a name of a server subjected to an operation manipulation. The node ID is an identification number of the relevant node. The antecedent node ID list is a list of node IDs corresponding to operation manipulations executed immediately before the relevant node. The subsequent node ID list is a list of node IDs corresponding to operation manipulations executed immediately after the relevant node. The execution order of an operation manipulation is defined by the antecedent node ID list and the subsequent node ID list. For nodes of operation manipulations executed in parallel, the parallel execution information is set as "parallel". For nodes of operation manipulations not executed in parallel, the parallel execution information is set as "non-parallel".

The processor 12 interprets the operation scenario 2 on the basis of the operation scenario execution information 11a and executes the operation manipulations for the servers 1a to 1d in the order described in the operation scenario 2. When the operation manipulation is executed, the processor 12 acquires the operation scenario execution information 11a from the storage unit 11 (S1). The processor 12 also acquires, from the monitoring device 3, availability information 4 indicating whether or not each of the servers is available (S2).

The processor 12 determines whether or not an unavailable server exists, on the basis of the acquired availability information 4. When it is determined that an unavailable server exists, the processor 12 generates execution determination information 5 indicating whether or not operation manipulations to be executed in parallel are to be actually executed in execution of the operation scenario, on the basis of the operation scenario execution information 11a (S3). For example, there is a case where a first operation manipulation that takes an unavailable server as a manipulation target is to be executed in parallel with another operation manipulation. In this case, the processor 12 generates the execution determination information 5 indicating that, among operation manipulations to be executed in parallel, execution of the first operation manipulation and a second operation manipulation having an antecedent dependency in execution order with the first operation manipulation are to be suppressed.

Upon generating the execution determination information 5, the processor 12 executes the operation scenario 2 for available servers, except for the operation manipulations indicated as to be suppressed in the execution determination information 5 (S4). For example, when executing the operation scenario 2, the processor 12 sequentially executes operation manipulations corresponding to nodes appearing while tracing connection lines from the start node 2a toward the end node 2h. At this time, the processor 12 does not execute an operation manipulation indicated as to be suppressed in the execution determination information 5.

In this system, assume that a failure has occurred in the server 1d when the operation scenario 2 is executed. The failure occurred in the server 1d is detected by the monitoring device 3. At a timing to start execution of the operation scenario 2, the processor 12 of the operation management apparatus 10 acquires the availability information 4 from the monitoring device 3 while acquiring the operation scenario execution information 11a from the storage unit 11. The availability information 4 indicates that the server 1d (server D) is unavailable.

Since the server 1d is unavailable, the processor 12 first identifies a node taking the server 1d as a manipulation target, on the basis of the operation scenario execution information 11a. In the example of FIG. 1B, the node 2f having the node ID "6" corresponds to an operation manipulation for the server 1d. The processor 12 checks the parallel execution information of the node 2f. Then, the node 2f turns out to correspond to an operation manipulation executed in parallel with another operation manipulation. Therefore, the processor 12 determines that execution of the operation manipulation corresponding to the node 2f having the node ID "6" is to be suppressed.

In addition, the processor 12 identifies a node corresponding to an operation manipulation having an antecedent dependency of execution order with the operation manipulation for the unavailable server 1d, among the nodes 2c to 2f (having node IDs "3" to "6", respectively) corresponding to operation manipulations executed in parallel. In the example of FIG. 1B, the node 2e having the node ID "5" corresponds to an operation manipulation executed before the node 2f. Therefore, the processor 12 determines that execution of the operation manipulation corresponding to the node 2e is to be suppressed.

Finally, the processor 12 generates the execution determination information 5 indicating that, among the operation manipulations within a section executed in parallel, execution of operation manipulations corresponding to the nodes 2c and 2d having the node IDs "3" and "4", respectively, are to be executed, and execution of the operation manipulations corresponding to the nodes 2e and 2f having the node IDs "5" and "6", respectively, are to be suppressed. Then, in accordance with the operation scenario 2, the processor 12 executes the operation manipulations corresponding to the nodes 2a to 2d, 2g, and 2h other than the nodes 2e and 2f for the available servers 1a and 1b.

In this way, even when some of the servers 1a to 1d taken as manipulation targets in the operation scenario 2 are unavailable, the operation scenario 2 may be executed to the extent that the operation scenario 2 is not affected by the stoppage of the unavailable servers. As a result, in a case where the operation scenario 2 for executing the operation manipulations collectively for the servers 1a to 1d is generated, even when abnormality occurs in some servers, it is possible to avoid a situation in which execution of all operation manipulations in the operation scenario are stopped.

For example, assume that data stored in memories of the servers 1a and 1c is stored into databases (DBs) of the servers 1b and 1d, respectively, and then a data backup is performed for the respective servers 1b and 1d. In this case, even when the server 1d has been failed, writing data stored in the server 1a into the DB of the server 1b and data backup for the server 1b are still possible. The data backup is desirably performed on the date and time specified in advance as much as possible. In the system according to the first embodiment, even when the server 1d is failed, writing data stored in the server 1a into the DB of the server 1b and the data backup for the server 1b may be performed at a regular time.

When the operation manipulation for the server 1c is executed despite the server 1d is unavailable, the operation manipulation may be unsuccessfully completed or may result in wrong processing. When such an operation manipulation is executed, there is a possibility of extra work such as the correction of the wrong processing. According to the first embodiment, execution of the operation manipulation corresponding to the node 2e to be executed before the operation manipulation for the server 1d in the operation scenario 2 is suppressed. Therefore, execution of an incomplete operation manipulation is suppressed, thereby improving reliability of operation manipulations.

The processor 12 may generate, for example, an alternate operation scenario reflecting a result of determination on whether or not each of the operation manipulations to be executed in parallel is to be actually executed in execution of the operation scenario. The alternate operation scenario is obtained by excluding, from the operation scenario 2, operation manipulations indicated as to be suppressed in the execution determination information 5. The generation of the alternate operation scenario facilitates execution of an operation scenario appropriate for available servers without making a determination on whether each operation manipulation is to be executed in execution of the operation scenario.

The processor 12 may also generate a re-execution operation scenario which is obtained by excluding operation manipulations indicated as to be executed in the execution determination information 5 from the operation scenario 2. In the example of FIG. 1B, a re-execution operation scenario is generated by excluding operation manipulations corresponding to the nodes 2c and 2d from the operation scenario 2. By generating the re-execution operation scenario, for example, when the server 1d is recovered from a failure, operation manipulations not executed in the execution of the operation scenario 2 may be correctly executed for minimal servers. As a result, less server resources may be used to reliably execute the unexecuted operation manipulations.

Even when all servers 1a to 1d are available when the execution of the operation scenario 2 is started, there may be a case where a failure occurs in some servers after the execution of the operation scenario 2 is started. In this case, for example, when execution of operation manipulations to be executed in parallel is not started, the processor 12 generates an alternate operation scenario. The reason why no alternate operation scenario is generated when execution of operation manipulations to be executed in parallel has been started is that the same operation manipulation may be repeatedly executed when the alternate operation scenario is generated and executed. That is, by generating an alternate operation scenario on the conditions that execution of operation manipulations to be executed in parallel is not started, the situation may be avoided in which the same operation manipulation is repeatedly executed.

The processor 12 may be implemented with, for example, a processor of the operation management apparatus 10. The storage unit 11 may be implemented with, for example, a memory of the operation management apparatus 10.

The lines connecting between various elements illustrated in FIG. 1A represent some of communication paths. However, communication paths other than the illustrated communication paths may be established.

Second Embodiment

Next, a second embodiment will be described. According to the second embodiment, a sequence of operation manipulations is described in a process definition. The process definition is an example of the operation scenario according to the first embodiment.

FIG. 2 is a diagram illustrating an exemplary configuration of a system according to the second embodiment. A plurality of servers 31 to 33, a terminal device 40, a monitoring device 50, and a management server 100 are connected with each other via a network 20. The servers 31 to 33 are computers for providing information processing services through the network 20. The terminal device 40 is a computer used by a system administrator. The monitoring device 50 is a computer for monitoring operation situations of the servers 31 to 33. The management server 100 is a computer which executes operation manipulations for the servers 31 to 33. The management server 100 is an example of the operation management apparatus 10 of the first embodiment illustrated in FIG. 1A.

Figure 3:
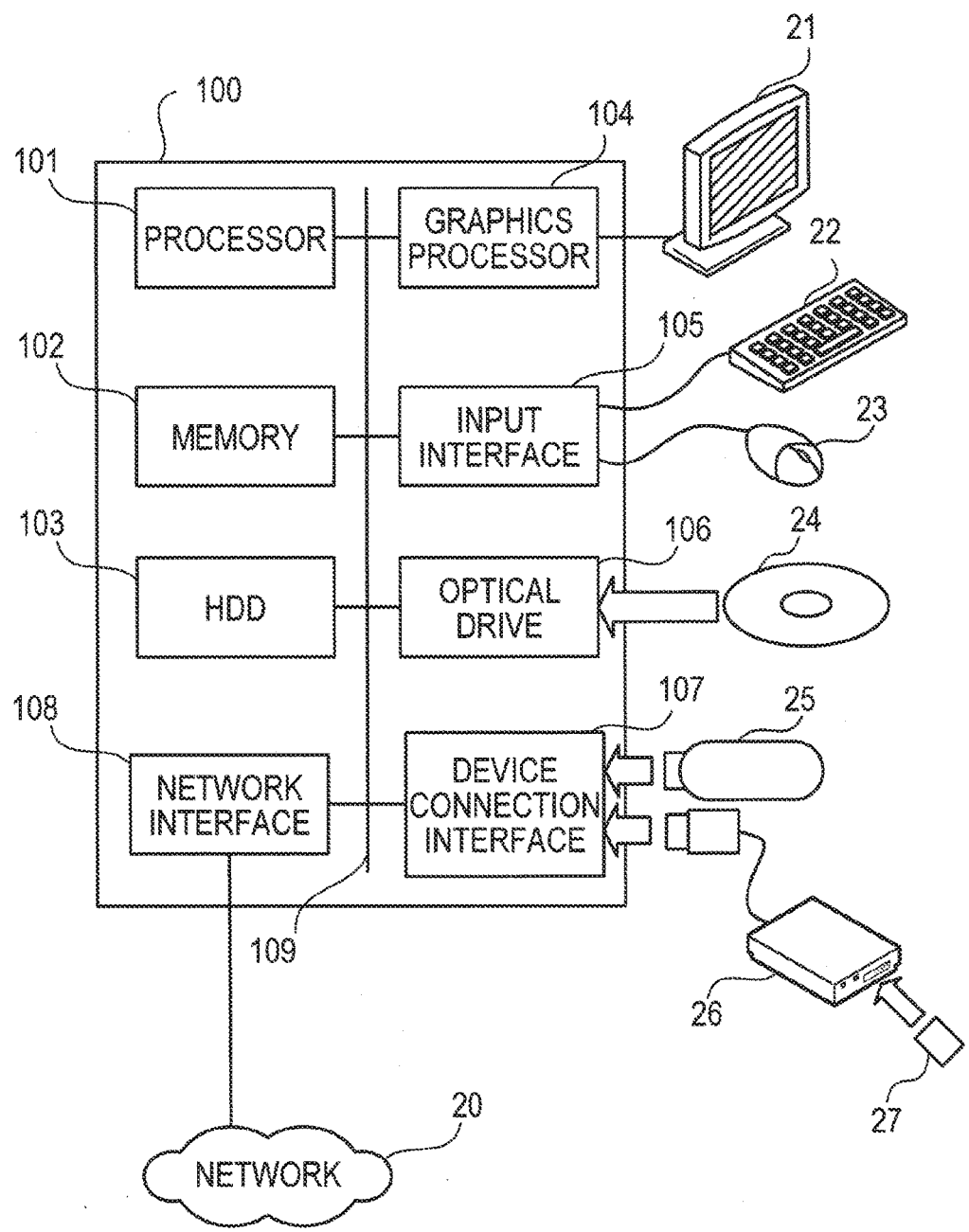
FIG. 3 is a diagram illustrating an exemplary hardware configuration of a management server according to a second embodiment.

FIG. 3 is a diagram illustrating an exemplary hardware configuration of the management server according to the second embodiment. The management server 100 is entirely controlled by a processor 101. The processor 101 is connected with a memory 102 and a plurality of peripheral devices via a bus 109. The processor 101 may be a multi-processor. The processor 101 is, for example, a central processing unit (CPU), a micro processing unit (MPU) or a digital signal processor (DSP). Part of functions implemented when a programs is executed by the processor 101 may be implemented with an electronic circuit such as an application specific integrated circuit (ASIC), a programmable logic device (PLD) or the like.

The memory 102 is used as a main memory of the management server 100. The memory 102 temporarily stores therein part of an operating system (OS) program and application programs which are executed by the processor 101. The memory 102 also stores therein a variety of data used for processing by the processor 101. An example of the memory 102 may include a volatile semiconductor memory such as a random access memory (RAM) or the like.

Examples of the peripheral devices connected to the bus 109 may include a hard disk drive (HDD) 103, a graphics processor 104, an input interface 105, an optical drive 106, a device connection interface 107 and a network interface 108.

The HDD 103 magnetically writes/reads data in/from an internal disk. The HDD 103 is used as an auxiliary memory of the management server 100. The HDD 103 stores therein an OS program, application programs, and a variety of data. A nonvolatile semiconductor memory (solid state drive (SSD)) such as a flash memory or the like is also used as an auxiliary memory.

A monitor 21 is connected to the graphics processor 104. The graphics processor 104 displays an image on a screen of the monitor 21 in accordance with an instruction from the processor 101. An example of the monitor 21 may include a display using a cathode ray tube (CRT), a liquid crystal display (LCD), or the like.

A keyboard 22 and a mouse 23 are connected to the input interface 105. The input interface 105 transmits a signal, which is sent from the keyboard 22 or the mouse 23, to the processor 101. The mouse 23 is an example of a pointing device and a different pointing device such as a touch panel, a tablet, a touch pad, a trackball, or the like may be used.

The optical drive 106 uses a laser light or the like to read data written in an optical disk 24. The optical disk 24 is a portable recording medium in which data is recorded in such a manner that the data may be read by light reflection. Examples of the optical disk 24 may include a digital versatile disc (DVD), a DVD-RAM, a compact disc read-only memory (CD-ROM), a CD-R (Recordable)/RW (Rewritable), and the like.

The device connection interface 107 is a communication interface for connecting the peripheral devices to the management server 100. For example, a memory device 25 and a memory reader/writer 26 may be connected to the device connection interface 107. The memory device 25 is a recording medium equipped with a function of communication with the device connection interface 107. The memory reader/writer 26 is a device for write/read of data in/from a memory card 27. The memory card 27 is a card type recording medium.

The network interface 108 is connected to the network 20. The network interface 108 exchanges data with another computer or communication device through the network 20.

With the hardware configuration described above, the functions of the management server 100 according to the second embodiment may be implemented. The servers 31 to 33, the terminal device 40, and the monitoring device 50 are also implemented with hardware similar to that of the management server 100. The operation management apparatus 10 according to the first embodiment is also implemented with hardware similar to that of the management server 100.

The functions of the management server 100 according to the second embodiment are implemented, for example, when a program stored in a computer-readable recording medium is executed by the management server 100. A program describing the processing contents to be performed by the management server 100 may be recorded in various recording media. For example, a program executed by the management server 100 may be stored in the HDD 103. The processor 101 loads at least a portion of the program stored in the HDD 103 into the memory 102 and executes the loaded program. The program executed by the management server 100 may be recorded in a portable recording medium such as the optical disk 24, the memory device 25, the memory card 27, or the like. For example, the program stored in the portable recording medium may be installed in the HDD 103 and then executed in accordance with the control from the processor 101. The processor 101 may directly read the program from the portable recording medium and execute the program.

Figure 4:
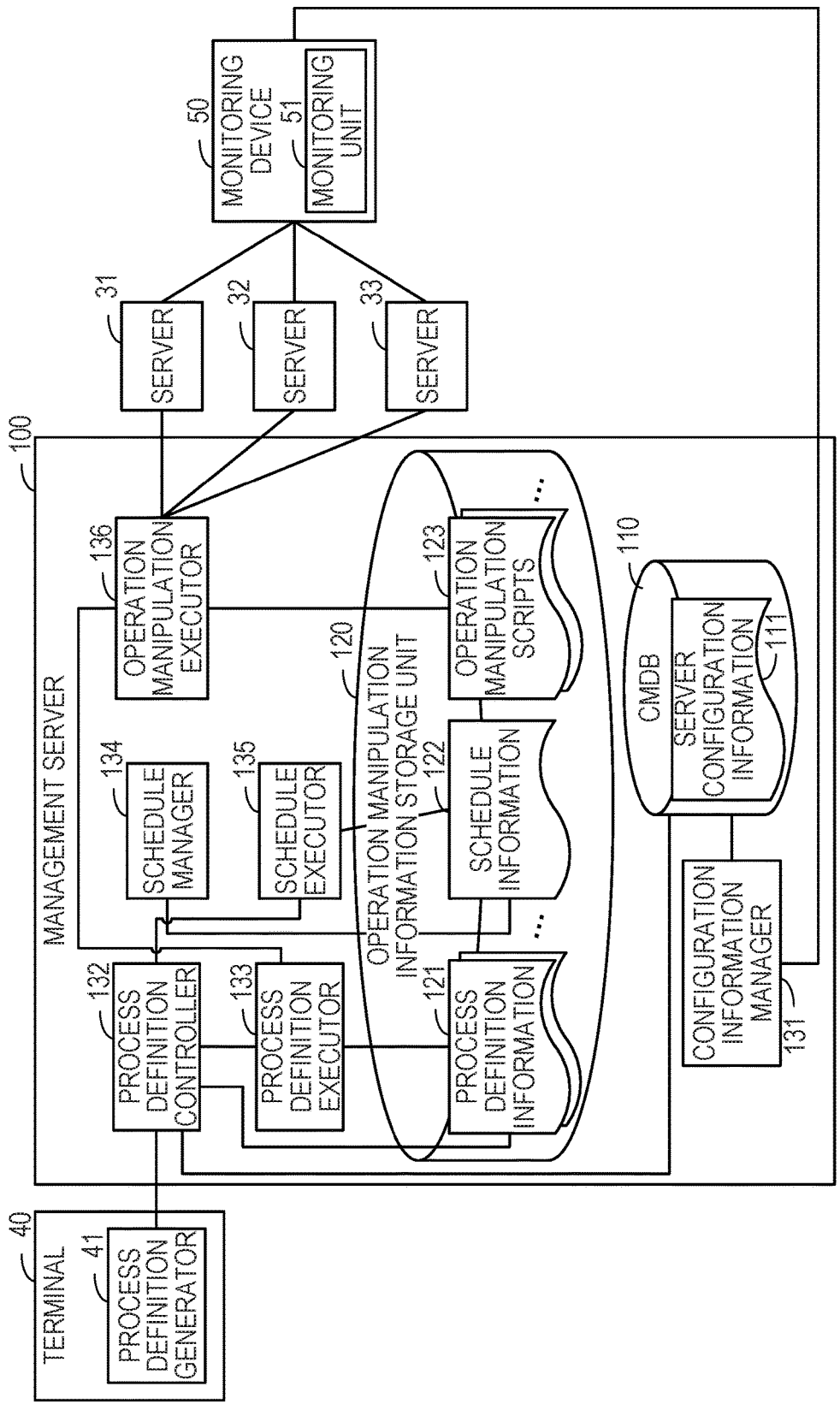
FIG. 4 is a diagram illustrating an operation manipulation function.

FIG. 4 is a diagram illustrating an operation manipulation function. The terminal device 40 includes a process definition generator 41. The process definition generator 41 generates process definition information indicating the process definition in accordance with a manipulation by an administrator. The process definition information is information indicating the definition (process definition) of an execution sequence (scenario) of operation manipulations when executing the operation manipulations for a plurality of servers. The process definition may include operation manipulations to be executed in parallel. Therefore, the process definition information includes information used to identify whether or not each of operation manipulations is to be executed in parallel with another operation manipulation. The process definition information is an example of the operation scenario execution information illustrated in FIG. 1A. The process definition generator 41 transmits the generated process definition information to the management server 100.

The monitoring device 50 includes a monitoring unit 51. The monitoring unit 51 monitors whether or not the servers 31 to 33 are being normally operated. For example, the monitoring unit 51 transmits a predetermined command to the servers 31 to 33 regularly and determines whether or not the servers 31 to 33 are being operated, on the basis of the presence or absence of an acknowledgement. If any of the servers is not being normally operated, the monitoring unit 51 informs the management server 100 of the fact that the server is not being operated.

The management server 100 includes a configuration management database (CMDB) 110, an operation manipulation information storage unit 120, a configuration information manager 131, a process definition controller 132, a process definition executor 133, a schedule manager 134, a schedule executor 135 and an operation manipulation executor 136.

The CMDB 110 is a database which stores therein information indicating a network configuration of the servers 31 to 33 and so on. The CMDB 110 contains server configuration information 111. The server configuration information 111 is information on the configuration and status of the respective servers 31 to 33.

The operation manipulation information storage unit 120 stores therein information used for automatic execution of the operation manipulations. For example, the operation manipulation information storage unit 120 stores therein plural pieces of process definition information 121, plural pieces of schedule information 122, and operation manipulation scripts 123. The process definition information 121 may include information generated by the process definition generator 41 and information automatically generated by the process definition controller 132. The schedule information 122 is information indicating an execution schedule of the process definition information 121. The operation manipulation scripts 123 are scripts describing an operation manipulation sequence for the servers 31 to 33.

The configuration information manager 131 manages network configuration information in the CMDB 110. For example, upon being informed by the monitoring device 50 of the fact that any server is not being normally operated, the configuration information manager 131 updates, in the server configuration information 111, information on the status of the relevant server.

The process definition controller 132 controls generation and registration of the process definition information 121. For example, the process definition controller 132 acquires the process definition information generated by the process definition generator 41 from the terminal device 40 and stores the acquired process definition information in the operation manipulation information storage unit 120. Upon receiving from the schedule executor 135 a notification of a process definition which has reached a time for execution, the process definition controller 132 instructs the process definition executor 133 to execute the process definition.

Upon receiving the notification of a process definition which has reached a time for execution, the process definition controller 132 may instruct the process definition executor 133 to execute an alternate process definition when a server not being normally operated is included in target servers subjected to the operation manipulations in the process definition. For example, the process definition controller 132 refers to the server configuration information 111 in the CMDB 110 to determine whether or not a server as a manipulation target in the process definition to be executed by the process definition executor 133 is being normally operated. In a case where a server not being normally operated is present, the process definition controller 132 determines whether or not a currently executable alternate process definition may be generated by excluding some operation manipulations including the operation manipulation for the relevant server. In a case where such an alternate process definition may be generated, the process definition controller 132 generates the process definition information 121 indicating the alternate process definition and stores the generated process definition information 121 in the operation manipulation information storage unit 120. When the process definition information 121 indicating the alternate process definition is generated, the process definition controller 132 instructs the process definition executor 133 to execute the alternate process definition on the basis of the newly generated process definition information 121.

The process definition controller 132 may also generate the process definition information 121 indicating a re-execution process definition for execution of operation manipulations excluded from the alternate process definition, among the operation manipulations in a process definition to be executed. Upon generating the process definition information 121 indicating a re-execution process definition, the process definition controller 132 stores the process definition information 121 in the operation manipulation information storage unit 120. The re-execution process definition is executed, for example, when an administrator inputs an execution instruction.

In accordance with an instruction from the process definition controller 132, the process definition executor 133 executes a process definition on the basis of the process definition information 121 stored in the operation manipulation information storage unit 120. For example, the process definition executor 133 determines an execution order of operation manipulations on the basis of the process definition to be executed. Then, the process definition executor 133 instructs the operation manipulation executor 136 to execute the operation manipulation in the order indicated in the process definition.

The schedule manager 134 manages an execution schedule of a process definition. For example, in accordance with an input from the administrator, the schedule manager 134 generates the schedule information 122 indicating an execution time of the process definition generated by the process definition generator 41. The schedule manager 134 stores the generated schedule information 122 in the operation manipulation information storage unit 120.

The schedule executor 135 manages the execution time of the process definition in accordance with the schedule information 122. For example, the schedule executor 135 refers to the schedule information 122 regularly, and when a process definition has reached an execution time, the schedule executor 135 informs the process definition controller 132 that it is time to execute the process definition.

The operation manipulation executor 136 executes the operation manipulations for the servers 31 to 33 on the basis of the operation manipulation scripts 123 stored in the operation manipulation information storage unit 120. For example, the operation manipulation executor 136 executes a designated operation manipulation for a server designated by the process definition executor 133. Preparation of the operation manipulations for the servers 31 to 33 may be included in the operation manipulations to be executed. For example, a message delivery indicating that a target server subjected to an operation manipulation is temporarily stopped is included in the operation manipulations executed by the operation manipulation executor 136.

The above-configured system facilitates execution of an appropriate operation process. The lines connecting between various elements illustrated in FIG. 4 represent some of communication paths. Communication paths other than the illustrated communication paths may also be established. The functions of various elements illustrated in FIG. 4 may be implemented when program modules corresponding to the elements are executed by a computer, for example.

Next, a variety of information held by the management server 100 will be described in detail.

Figure 5:
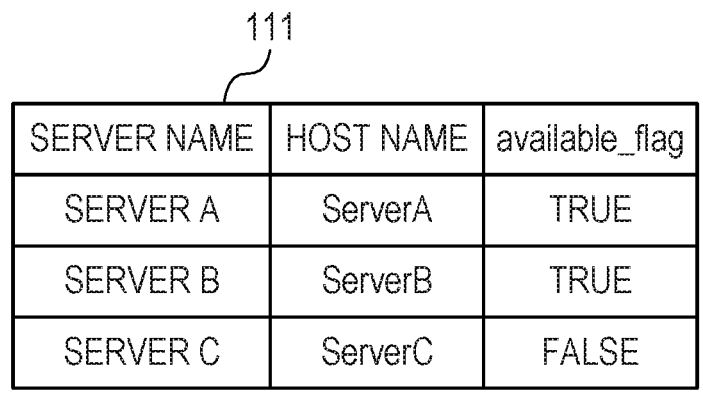
FIG. 5 is a diagram illustrating an example of server configuration information.

FIG. 5 is a diagram illustrating an example of the server configuration information. The server configuration information 111 includes a server name, a host name and an available_flag for each server. The server name is a name of a server in the system. The host name is a name of the server in the network. The available_flag is a flag indicating whether or not a server is being normally operated. For example, an available_flag of a server being normally operated is "TRUE" and an available_flag of a server not being normally operated is "FALSE".

The available_flag is set, for example, by the monitoring unit 51 of the monitoring device 50. The available_flag may also be set in accordance with an input by an administrator of the management server 100. For example, when performing maintenance of a server in accordance with a planned schedule, the administrator sets the available_flag of the server to "FALSE".

Figure 6:
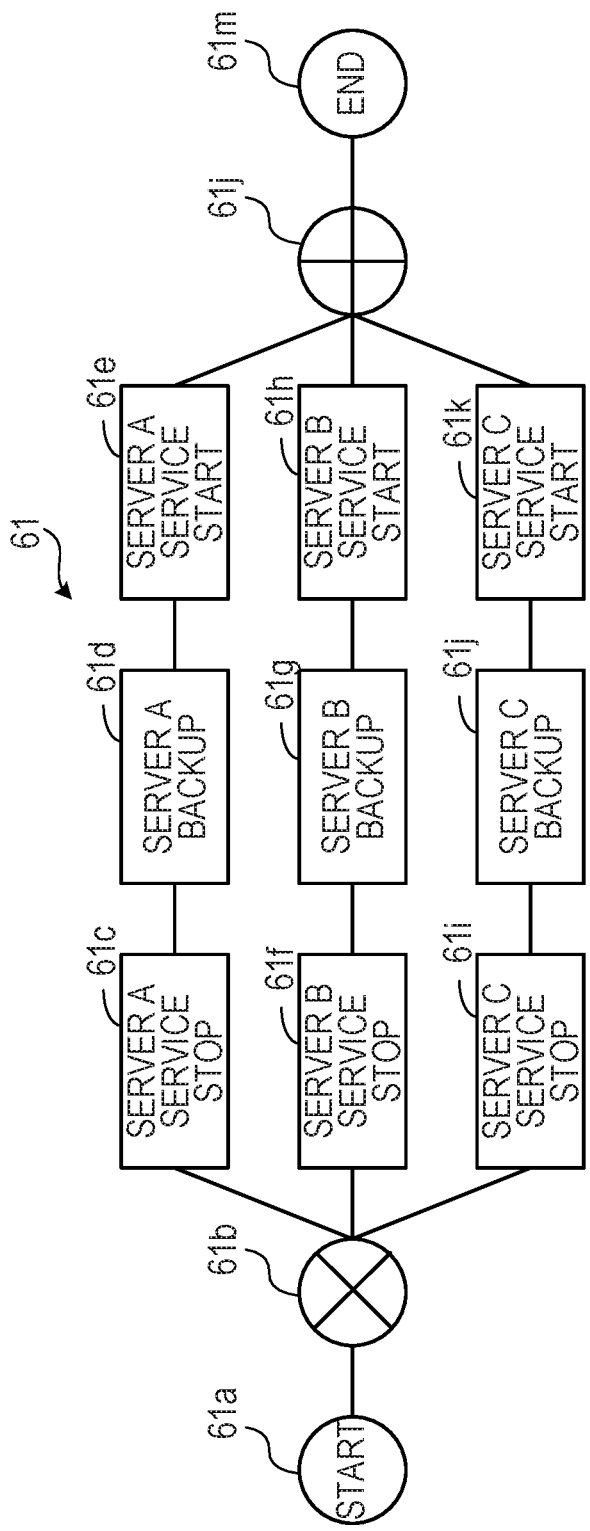
FIG. 6 is a diagram illustrating an example of a process definition.

FIG. 6 is a diagram illustrating an example of a process definition. Relationships between a plurality of nodes 61a to 61m are defined in a process definition 61. A start node 61a among the nodes 61a to 61m represents a start position of an operation scenario. An end node 61m represents an end position of the operation scenario. A node 61b represents a parallel execution start. A node 61j represents a parallel execution end. Nodes 61c to 61k represent operation manipulations for servers. In FIG. 6, the relationships between the nodes 61a to 61m are represented by the connection lines between the nodes. The nodes of operation manipulations appearing while tracing the relationships between the nodes from the start node 61a toward the end node 61m are executed in an appearance order.

In the example of FIG. 6, an operation scenario of data backup for the plurality of servers 31 to 33 is described in the process definition 61. Since the data backup for the servers may be executed in parallel, operation manipulations for the respective servers are defined as parallel processing. Operation manipulations for the server 31 having a server name "server A" are described as the nodes 61c to 61e. Operation manipulations for the server 32 having a server name "server B" are described as the nodes 61f to 61h. Operation manipulations for the server 33 having a server name "server C" are described as the nodes 61i to 61k.

The process definition 61 is stored, for example, as the process definition information 121, in the operation manipulation information storage unit 120.

FIG. 7 is a diagram illustrating an example of process definition information. Process definition information 121a may be managed with a data table. The process definition information 121a is assigned with a process definition ID which uniquely identifies a process definition. In the process definition information 121a, a node name, a target server, a node ID, an antecedent node ID list, a subsequent node ID list, a parallel execution start node ID, a parallel execution end node ID, and status information are registered for each node.

The node name is a name of the node. The target server is a name of a server subjected to an operation manipulation corresponding to the node. In a case where there is no server to be manipulated, the target server is "NULL". The node ID is a node identification number in the process definition information 121a. The antecedent node ID list is a list of node IDs of nodes indicating operation manipulations executed immediately before the operation manipulation corresponding to the relevant node. The subsequent node ID list is a list of node IDs of nodes indicating operation manipulations executed immediately after the operation manipulation of the relevant node. The parallel execution start node ID is a node ID of a node indicating a parallel execution start of a parallel execution section including the relevant node. The parallel execution end node ID is a node ID of a node indicating a parallel execution end of a parallel execution section including the relevant node. The status information is information indicating the execution status of an operation manipulation corresponding to a node. The node status may include "waiting", "executing", and "completed".

FIG. 8 is a diagram illustrating an example of schedule information. The schedule information 122 has, for example, a data structure in a table format. In the schedule information 122, for example, an execution start date and time and an execution result are registered in association with a process definition ID. The process definition ID is identification information of a process definition to be executed. The execution start date and time is a date and time at which a corresponding process definition is to be executed. The execution start date and time may be set with a regularly-repeated execution date and time such as, for example, a daily execution start time. A process definition for which no execution start date and time is set is to be executed when being instructed by the administrator or immediately after the process definition is generated. For example, an alternate process definition is executed immediately after the alternate process definition is generated. A re-execution process definition is executed when being instructed by the administrator. A process definition not yet executed is set with "unexecuted" as an execution result. A process definition already executed is set with "completed" as an execution result.

The above-described information may be used to execute a process definition which has reached an execution start time.

Next, an operation manipulation using a process definition according to the second embodiment will be described in detail.

In the second embodiment, as preconditions, it is assumed that the dependency between the execution orders of nodes corresponding to operation manipulations in the process definition is resolved with the serial/parallel relationship between nodes in each process definition. That is, when the nodes are connected in series, a restriction on an execution order according to a connection order exists. When the nodes are connected in parallel, there is no antecedent dependency between execution orders.

As an advance preparation, an administrator uses the process definition generator 41 to generate a process definition. At this time, the administrator sets a parallel execution start node and a parallel execution end node in the process definition information. In addition, the administrator sets information (parallel execution start node ID and parallel execution end node ID) on a parallel execution section for the nodes corresponding to operation manipulations executed in parallel. When the information on a parallel execution section is set, it may be known that the operation manipulations corresponding to the nodes are executed in parallel. In addition, the administrator sets an antecedent node ID list and a subsequent node ID list for each node in the process definition information. The dependency between the nodes is defined by the antecedent node ID list and the subsequent node ID list.

With the above-mentioned preconditions and advance preparation, in a case where there exists an unavailable server, it is possible to appropriately identify a node which may be excluded from the process definition. By executing an alternate process definition in which excludable nodes are excluded, it is possible to execute operation manipulations while avoiding manipulations for the unavailable server.

In addition, on the basis of the information on a parallel execution section conserved in the node information and node information excluded when the alternate process definition is generated, the management server 100 may generate a re-execution process definition without repeated operation manipulations and set the re-execution process definition to a "waiting" status. By executing the generated re-execution process definition, it is possible to execute operation manipulations for minimal servers at the time of the recovery of the system.

Hereinafter, an execution procedure of operation manipulations using a process definition will be described with reference to a flowchart.

Figure 9:
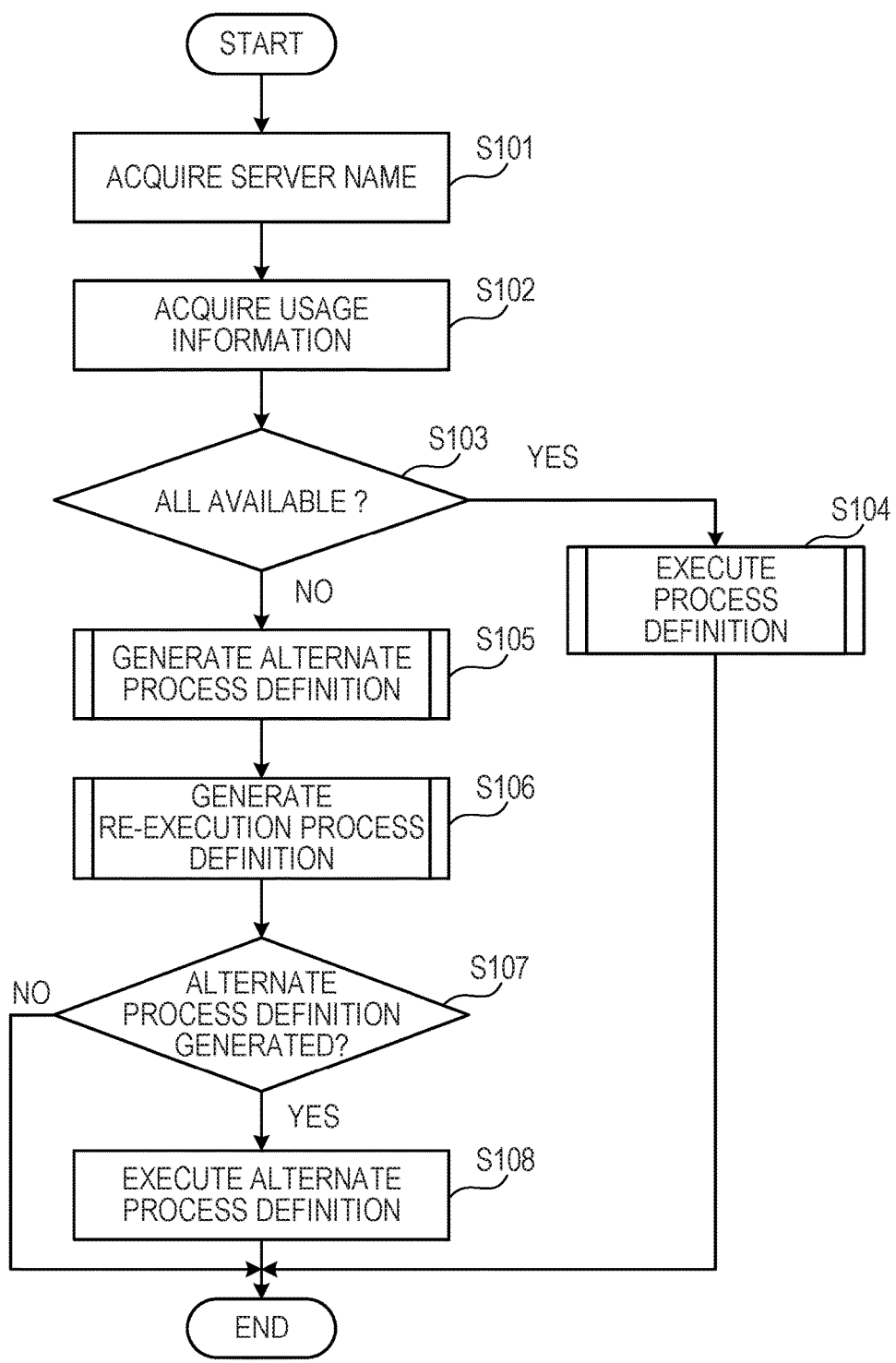
FIG. 9 is a flowchart illustrating an exemplary sequence of controlling execution of a process definition.

FIG. 9 is a flowchart illustrating an exemplary sequence of controlling execution of a process definition.

(S101) At a process definition execution start time, the process definition controller 132 acquires a server name of a target server subjected to an operation manipulation in the process definition. For example, upon receiving, from the schedule executor 135, a notification indicating that a process definition designating a process definition ID is now to be executed, the process definition controller 132 acquires the process definition corresponding to the designated process definition ID from the operation manipulation information storage unit 120. Then, the process definition controller 132 extracts a server name of a target server of each node from the acquired process definition.

(S102) The process definition controller 132 acquires usage information of the target server. For example, the process definition controller 132 refers to the server configuration information 111 in the CMDB 110 to extract available_flag as usage information of the target server in the process definition to be executed.

(S103) The process definition controller 132 determines whether or not all target servers are available. For example, if available_flag of all servers are "TRUE", the process definition controller 132 determines that all servers are available. When it is determined that there is at least one server having available_flag of "FALSE", the process definition controller 132 determines that there is an unavailable server.

In this manner, before the process definition including operation manipulations to be executed in parallel is executed, it is checked whether or not there exists an unavailable server among the target servers 31 to 33. When it is determined that all servers are available, the process proceeds to S104. When it is determined that there is an unavailable server, the process proceeds to S105.

(S104) The process definition controller 132 instructs the process definition executor 133 to execute the process definition which has reached an execution start time. Then, the process definition executor 133 acquires the process definition to be executed, from the operation manipulation information storage unit 120, traces the connection relationships between nodes in an order from a start node, and instructs the operation manipulation executor 136 to execute an operation manipulation corresponding to the node in an appearance order. The operation manipulation executor 136 acquires an operation manipulation script of the operation manipulation instructed to execute, from the operation manipulation information storage unit 120. Then, the operation manipulation executor 136 executes the operation manipulation for the target server in accordance with the acquired operation manipulation script. Thereafter, execution of the process definition is terminated.

When an abnormality of a server is detected after the execution of the process definition is instructed and before the operation manipulations according to the process definition are completed, the process definition controller 132 stops the execution of the process definition and generates an alternate process definition. Then, execution of operation manipulations according to the alternate process definition is instructed. A process including a measure against the detected server abnormality after the instruction to execute the alternate process definition will be described later (see FIG. 14).

(S105) In a case where there exists an unavailable server subjected to operation manipulations, the process definition controller 132 generates an alternate process definition. A process of generating the alternate process definition will be described later in detail (see FIG. 10). In a case where a target server subjected to an operation manipulation corresponding to a node out of the parallel execution section is unavailable, no alternate process definition is generated.

(S106) The process definition controller 132 generates a re-execution process definition. A process of generating the re-execution process definition will be described later in detail (see FIG. 12).

(S107) The process definition controller 132 determines whether or not an alternate process definition has been generated. When it is determined that the alternate process definition has been generated, the process proceeds to S108. When it is determined that the alternate process definition has not been generated, the process is ended.

(S108) The process definition controller 132 sends an instruction to execute the alternate process definition to the process definition executor 133. Then, the process definition executor 133 executes the alternate process definition in cooperation with the operation manipulation executor 136.

As described above, a process definition which has reached an execution time or an alternate process definition generated from the process definition is executed.

Next, the process of generating the alternate process definition will be described in detail.

Figure 10:
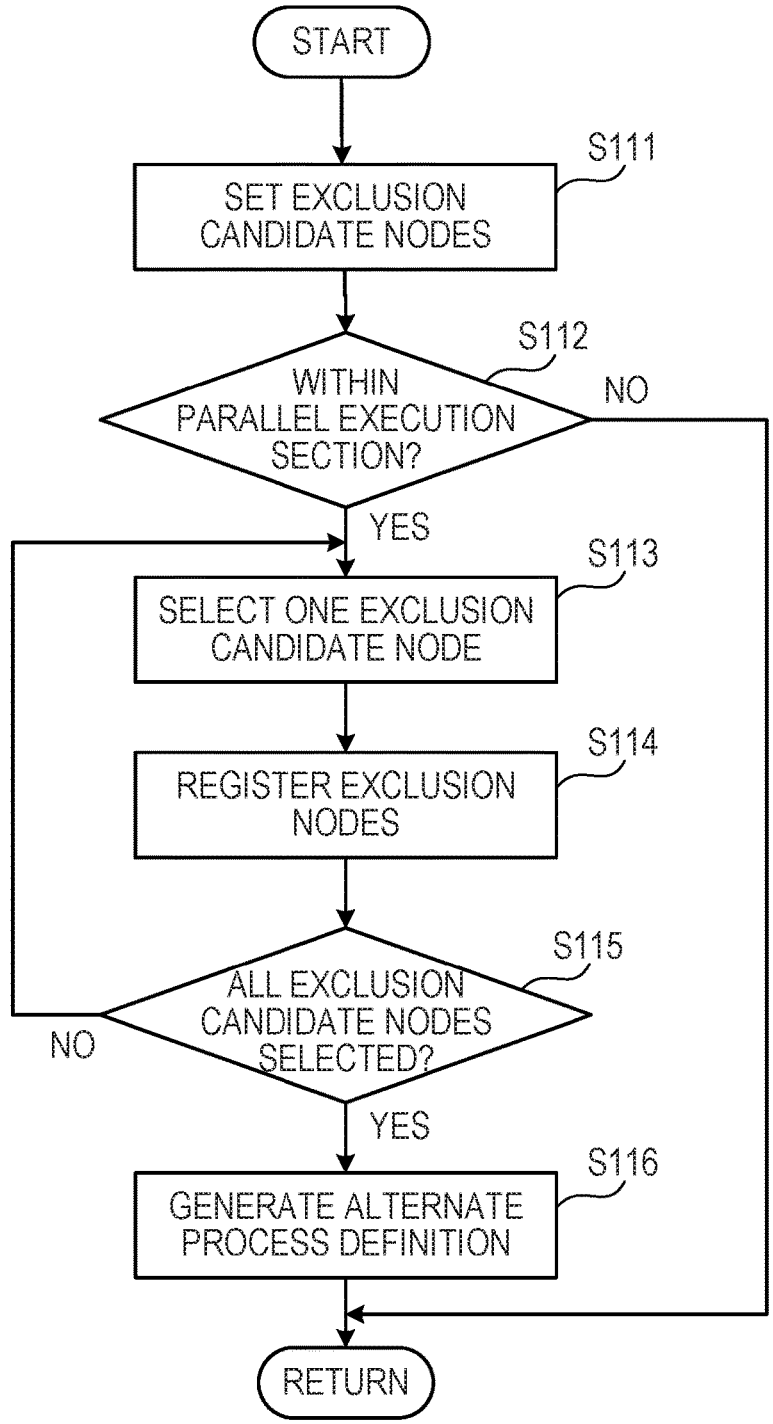
FIG. 10 is a flowchart illustrating an exemplary sequence of generating an alternate process definition.

FIG. 10 is a flowchart illustrating an exemplary sequence of generating the alternate process definition.

(S111) The process definition controller 132 sets nodes for executing an operation manipulation for an unavailable server as exclusion candidate nodes among the nodes in the process definition which has reached an execution start time.

(S112) The process definition controller 132 determines whether all exclusion candidate nodes are within a parallel execution section. For example, the process definition controller 132 refers to the process definition information 121a (see FIG. 7) to determine whether a parallel execution start node ID and a parallel execution end node ID are set for every exclusion candidate node. An exclusion candidate node set with the parallel execution start node ID and the parallel execution end node ID is determined as a node within the parallel execution section. When it is determined that all exclusion candidate nodes are within the parallel execution section, the process proceeds to S113. When it is determined that at least one exclusion candidate node is out of the parallel execution section, it is determined that the alternate process definition is unable to be generated, and the process of generating the alternate process definition is ended.

(S113) The process definition controller 132 selects one exclusion candidate node from not-yet-selected exclusion candidate nodes.

(S114) The process definition controller 132 registers all nodes in a parallel execution section, through which the selected exclusion candidate node passes, as exclusion nodes. For example, the process definition controller 132 assumes the selected exclusion candidate node as an exclusion node. Next, the process definition controller 132 traces a node, which is listed in the antecedent node ID list, in the process definition information 121a (see FIG. 7), in an order from the selected exclusion candidate node, up to a parallel execution start node. Then, the process definition controller 132 assumes each node between the selected exclusion candidate node and the parallel execution start node, as an exclusion node. Likely, the process definition controller 132 traces a node, which is listed in the subsequent node ID list, in the process definition information 121a (see FIG. 7), in an order from the selected exclusion candidate node, up to a parallel execution end node. Then, the process definition controller 132 assumes each node between the selected exclusion candidate node and the parallel execution end node, as an exclusion node.

(S115) The process definition controller 132 determines whether or not all exclusion candidate nodes have been selected. When it is determined that all exclusion candidate nodes have been selected, the process proceeds to S116. When it is determined that there exists a not-yet-selected exclusion candidate node, the process proceeds to S113.

(S116) The process definition controller 132 generates an alternate process definition obtained by excluding the exclusion nodes from the process definition which has reached an execution start time. The process definition controller 132 stores the generated alternate process definition in the operation manipulation information storage unit 120.

In this way, the alternate process definition is generated. As illustrated in FIG. 10, it is checked whether or not all exclusion candidate nodes exist within the parallel execution section. In a case where at least some exclusion candidate nodes exist out of the parallel execution section (in a serial section), it is determined that the exclusion candidate nodes are unable to be excluded and no alternate process definition is generated. Thus, neither the original process definition nor the alternate process definition is executed and the process is ended. In a case where all exclusion candidate nodes exist within the parallel execution section, it is determined that the exclusion candidate nodes may be excluded and an alternate process definition excluding the entire nodes within the parallel execution section including a node corresponding to an operation manipulation for an unavailable server is generated and executed.

Figure 11:
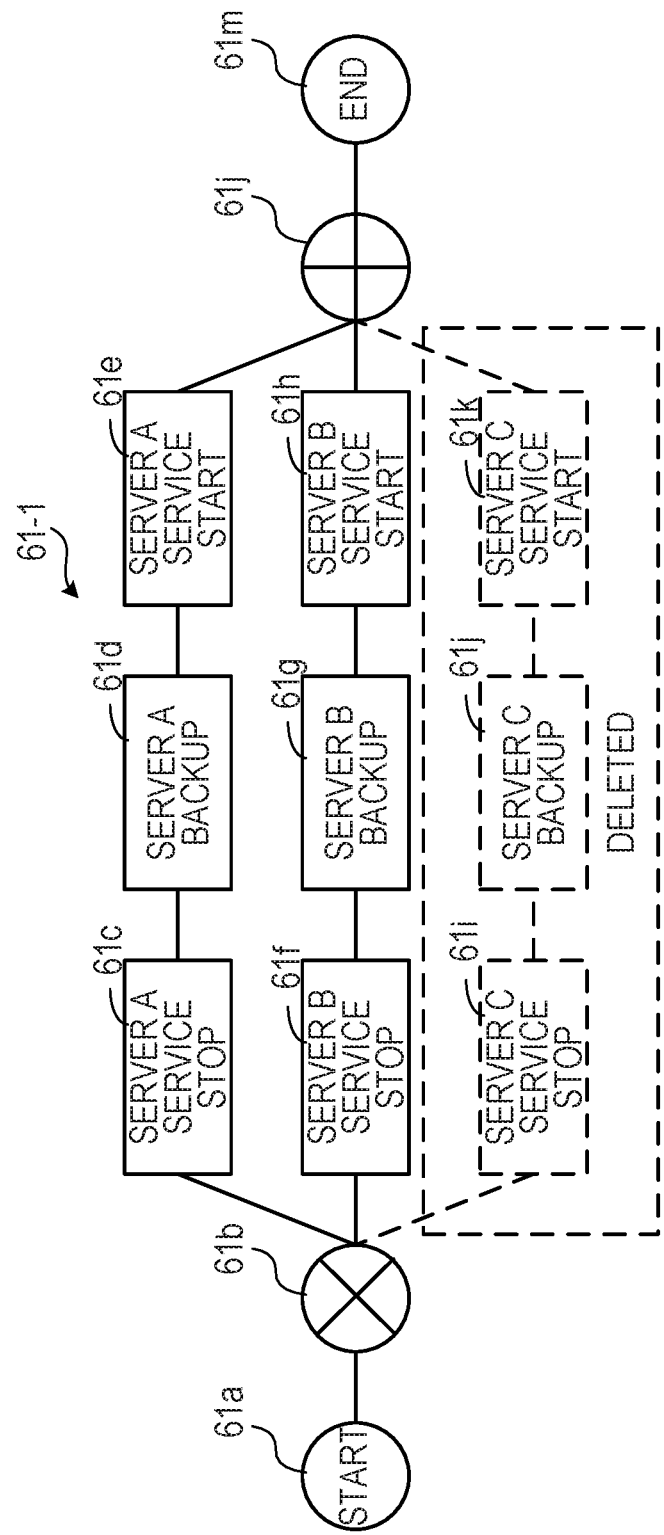
FIG. 11 is a diagram illustrating an example of an alternate process definition.

FIG. 11 is a diagram illustrating an example of an alternate process definition. The example of FIG. 11 is an alternate process definition 61-1 generated because the server 33 having the server name "server C" is unavailable when the process definition 61 illustrated in FIG. 6 is to be executed. In the alternate process definition 61-1, three nodes 61i to 61k are deleted from the original process definition 61.

In this way, by deleting all nodes within the parallel execution section including a node indicating an operation manipulation for an unavailable server, it is possible to appropriately execute operation manipulations for an available server. That is, in the example of FIG. 11, even when the server 33 having the server name "server C" is unable to be used, it is possible to execute operation manipulations of backup for other servers 31 and 32.

Next, the process of generating a re-execution process definition will be described in detail.

Figure 12:
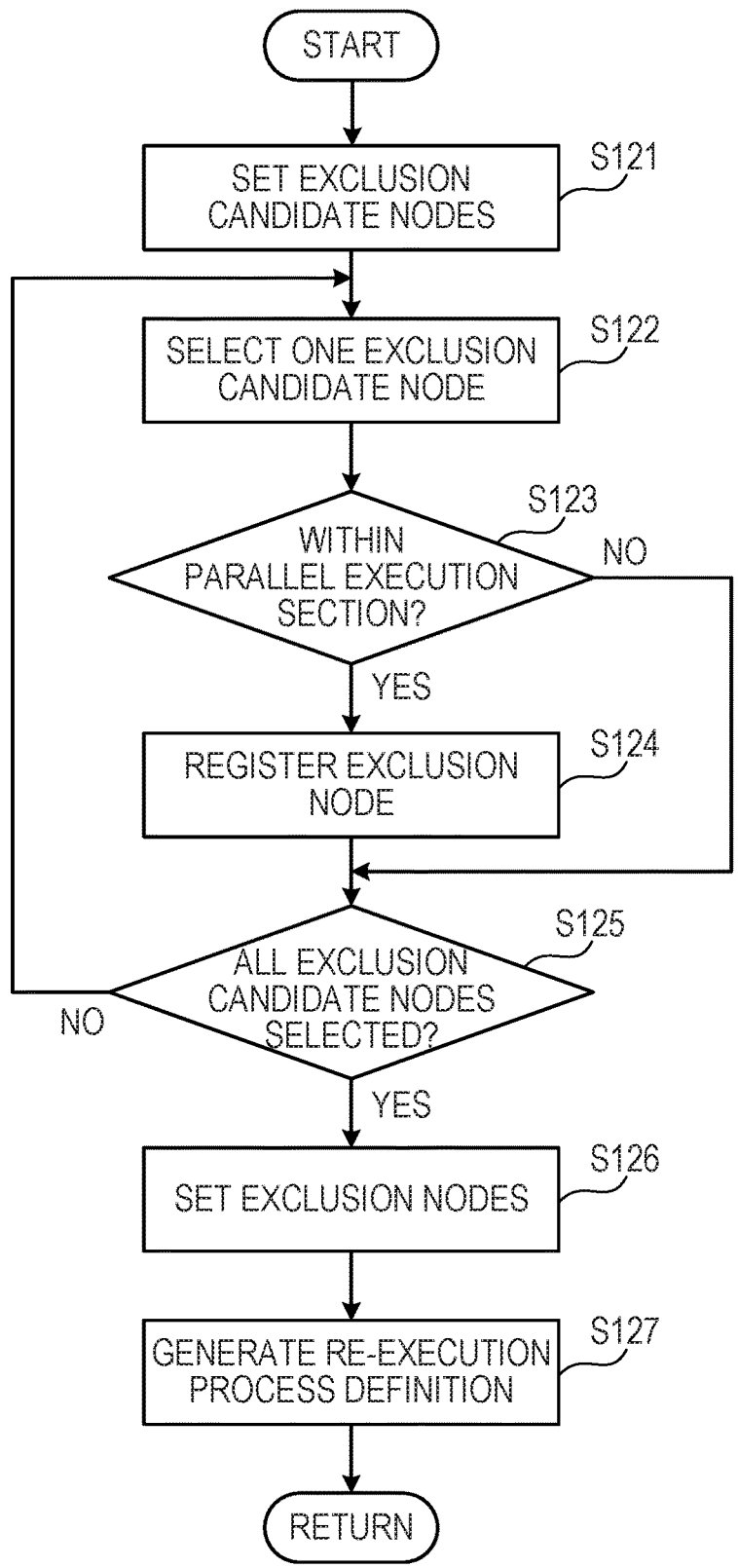
FIG. 12 is a flowchart illustrating an exemplary sequence of generating a re-execution process definition.

FIG. 12 is a flowchart illustrating an exemplary sequence of generating the re-execution process definition.

(S121) The process definition controller 132 sets nodes for executing operation manipulations for an available server as exclusion candidate nodes, among the nodes in the process definition which has reached an execution start time.

(S122) The process definition controller 132 selects one exclusion candidate node from not-yet-selected exclusion candidate nodes.

(S123) The process definition controller 132 determines whether or not the selected exclusion candidate node is within a parallel execution section. The determination on whether or not the selected exclusion candidate node is within the parallel execution section may be made, for example, by determining whether or not a parallel execution start node ID and a parallel execution end node ID are set for the exclusion candidate node in the process definition information 121a (see FIG. 7). When it is determined that the parallel execution start node ID and the parallel execution end node ID are set, the exclusion candidate node is within the parallel execution section. When it is determined that the selected exclusion candidate node is within the parallel execution section, the process proceeds to S124. When it is determined that the selected exclusion candidate node is out of the parallel execution section, the process proceeds to S125.

(S124) The process definition controller 132 registers the selected exclusion candidate node as an exclusion node.

(S125) The process definition controller 132 determines whether or not all exclusion candidate nodes have been selected. When it is determined that all exclusion candidate nodes have been selected, the process proceeds to S126. When it is determined that there exists a not-yet-selected exclusion candidate node, the process proceeds to S122.

(S126) The process definition controller 132 registers all other nodes in the parallel execution section, through which the selected exclusion candidate node passes, as exclusion nodes.

(S127) The process definition controller 132 generates a re-execution process definition which is obtained by deleting exclusion nodes from the process definition which has reached an execution start time. The process definition controller 132 stores the generated re-execution process definition in the operation manipulation information storage unit 120.

In this way, the re-execution process definition is generated.

Figure 13:
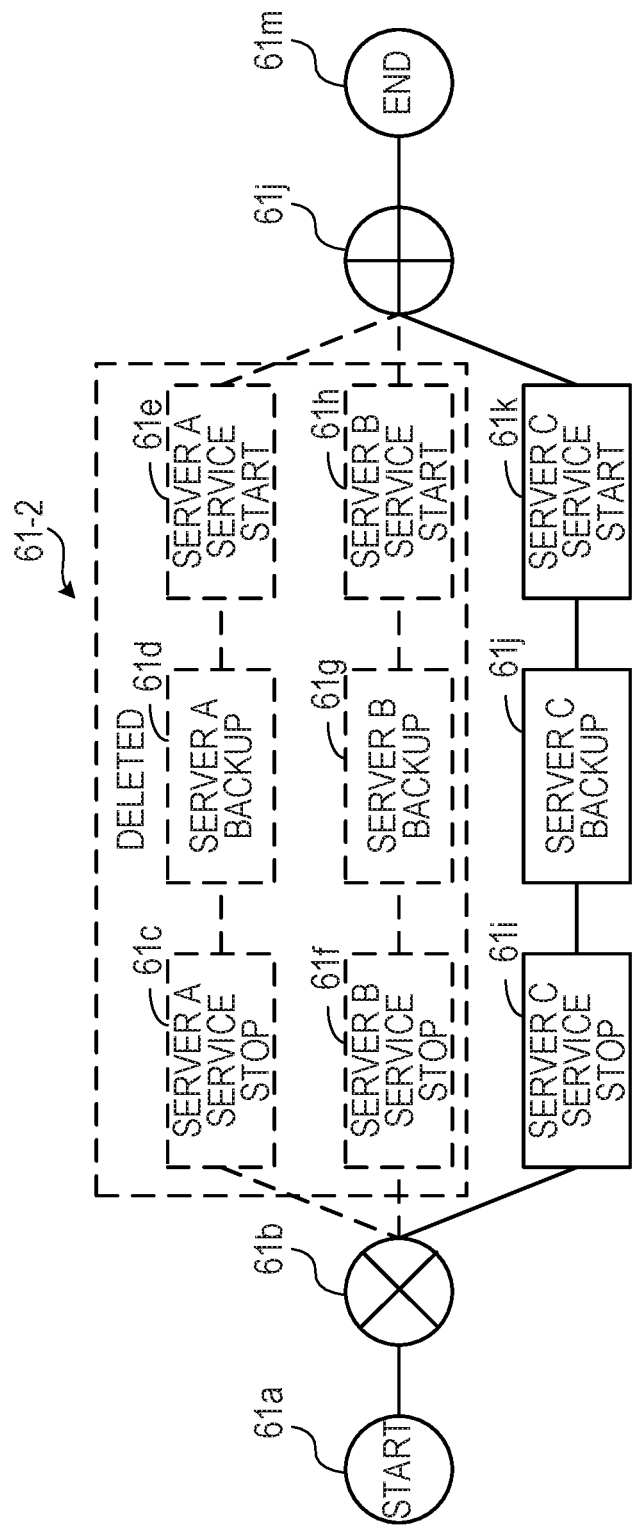
FIG. 13 is a diagram illustrating an example of a re-execution process definition.

FIG. 13 is a diagram illustrating an example of a re-execution process definition. The example of FIG. 13 is a re-execution process definition 61-2 generated because the server 33 having the server name "server C" is unavailable when the process definition 61 illustrated in FIG. 6 is to be executed. In the re-execution process definition 61-2, six nodes 61c to 61h are deleted from the original process definition 61.

In this way, by deleting, from the process definition 61, the nodes within the parallel execution section in the alternate process definition 61-1, it is possible to generate the re-execution process definition 61-2 to allow a currently unavailable server to appropriately execute operation manipulations later. In the example of FIG. 13, excluding the servers 31 and 32 in which the operation manipulations have been already executed by the alternate process definition 61-1, it is possible to execute operation manipulations of backup for only the server 33.

There is a case where an abnormality of a server is detected during execution of operation manipulations according to a process definition. In such a case, the execution of the process definition is stopped and the alternate process definition is executed.

Figure 14:
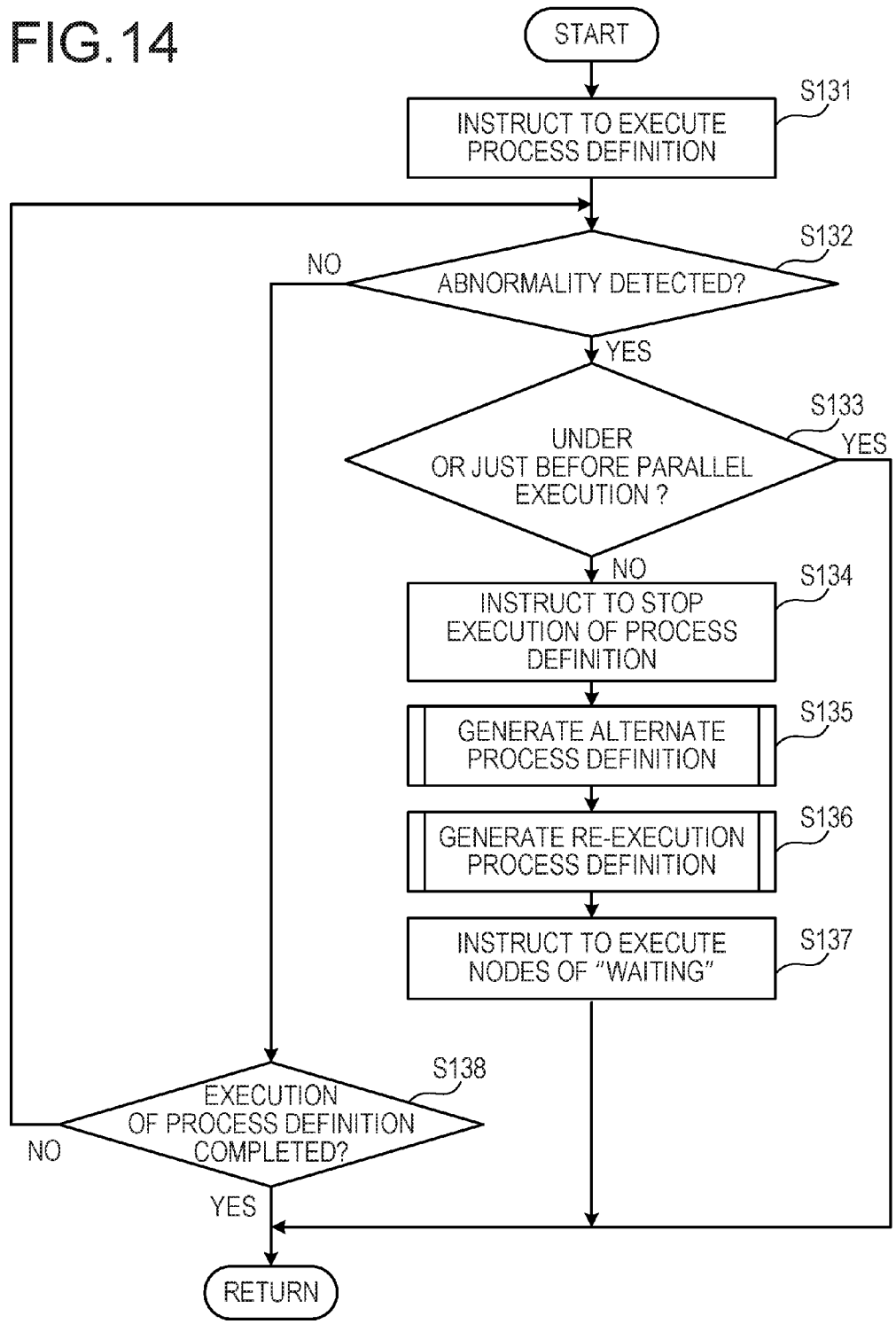
FIG. 14 is a flowchart illustrating an exemplary sequence of executing a process definition.

FIG. 14 is a flowchart illustrating an exemplary sequence of executing a process definition.

(S131) The process definition controller 132 instructs the process definition executor 133 to execute a process definition. In accordance with this instruction, the process definition executor 133 executes operation manipulations in accordance with the process definition in cooperation with the operation manipulation executor 136.

(S132) The process definition controller 132 determines whether or not abnormality of a server is detected. For example, the process definition controller 132 refers to the server configuration information 111 to check available_flag of a server included in the target servers of the process definition under execution. When it is determined that there is a server having available_flag set to "FALSE", it is determined that server abnormality is detected. When it is determined that a server abnormality is detected, the process proceeds to S133. When it is determined that no server abnormality is detected, the process proceeds to S138.

(S133) The process definition controller 132 determines whether or not a node within the parallel execution section is under execution or a node to be executed next exists within the parallel execution section. For example, the process definition controller 132 checks the status of each node by referring to a process definition being currently executed. A node having the status of "executing" is a node being currently executed. When it is determined that a parallel execution start node ID and a parallel execution end node ID are set for a node being executed, it may be known that a node within the parallel execution section is being executed. The node to be executed next may be identified by referring to a subsequent node ID list of the node being executed. When it is determined that a parallel execution start node ID and a parallel execution end node ID are set for the node to be executed next, it may be known that the node to be executed next exists within the parallel execution section.

In a case where a node being executed is a node within the parallel execution section or a node to be executed next is within the parallel execution section, the process definition being currently executed is still executed without generating an alternate process definition and then the process is ended. In a case where the node being executed is within the parallel execution section, an operation manipulation has been already executed for a parallel execution section including a node taking an abnormal server as a manipulation target. Therefore, replacing the process definition being executed with an alternate process definition excluding the parallel execution section is insignificant. Therefore, the current process definition is still executed without generating an alternate process definition. In a case where the node to be executed next is within the parallel execution section, there is a possibility that parallel branching has been already completed. Therefore, even when the node to be executed next is within the parallel execution section, the process definition controller 132 generates no alternate process definition, as in the case of executing a node within the parallel execution section. That is, the process definition being executed is still executed and a manipulation for a node corresponding to an operation manipulation for an unavailable server is failed.

In a case where a node being executed is not a node within the parallel execution section and a node to be executed next is also not within the parallel execution section, since there is a possibility of avoiding execution of an operation manipulation for an unavailable server, the process proceeds to S134 where an alternate process definition is generated.

(S134) The process definition controller 132 instructs the process definition executor 133 to stop the execution of the process definition being currently executed. Upon receiving the instruction, process definition executor 133 suppresses instructions to execute operation manipulations corresponding to nodes later than the node corresponding to the current operation manipulation.

(S135) The process definition controller 132 generates an alternate process definition. Details of a process of generating the alternate process definition are as illustrated in FIG. 10. Information of the status (on whether or not a node is in "waiting") in the original process definition is passed over to the generated alternate process definition. In the processing of setting the exclusion candidate nodes (S111 in FIG. 10) in the process of generating the alternate process definition, nodes of "executing" and "completed" are determined to be out of exclusion candidates and exclusion candidate nodes are selected from nodes of "waiting".

(S136) The process definition controller 132 generates a re-execution process definition. Details of a process of generating the re-execution process definition are as illustrated in FIG. 12.

(S137) The process definition controller 132 instructs the process definition executor 133 to execute operation manipulations corresponding to the nodes of "waiting" in the alternate process definition starting with a node earliest in the execution order. In accordance with the instruction, the process definition executor 133 begins to execute operation manipulations corresponding to the nodes of "waiting" in the alternate process definition starting with a node earliest in the execution order. Thereafter, the process of executing the process definition is ended.

(S138) The process definition controller 132 determines whether or not the execution of the process definition has been completed. When it is determined that the execution of the process definition has been completed, the process of executing the process definition is ended. Otherwise, the process proceeds to S132.

In this way, even when a server abnormality is detected after starting the execution of a process definition, it is possible to generate an alternate process definition. That is, in a case where an unavailable server is detected after starting the execution of a process definition including execution of operation manipulations in parallel for a plurality of servers, nodes of "waiting" among nodes for manipulating the server becomes exclusion candidate nodes. In a case where the exclusion candidate nodes are within the parallel execution section, an alternate process definition not executing the exclusion candidate nodes is generated and executed. In a case where the exclusion candidate nodes are out of the parallel execution section, the execution of process definition is stopped after a node being executed is terminated.

Hereinafter, an example of generating an alternate process definition when a server abnormality is detected during execution of a process definition will be described.

Figure 15:
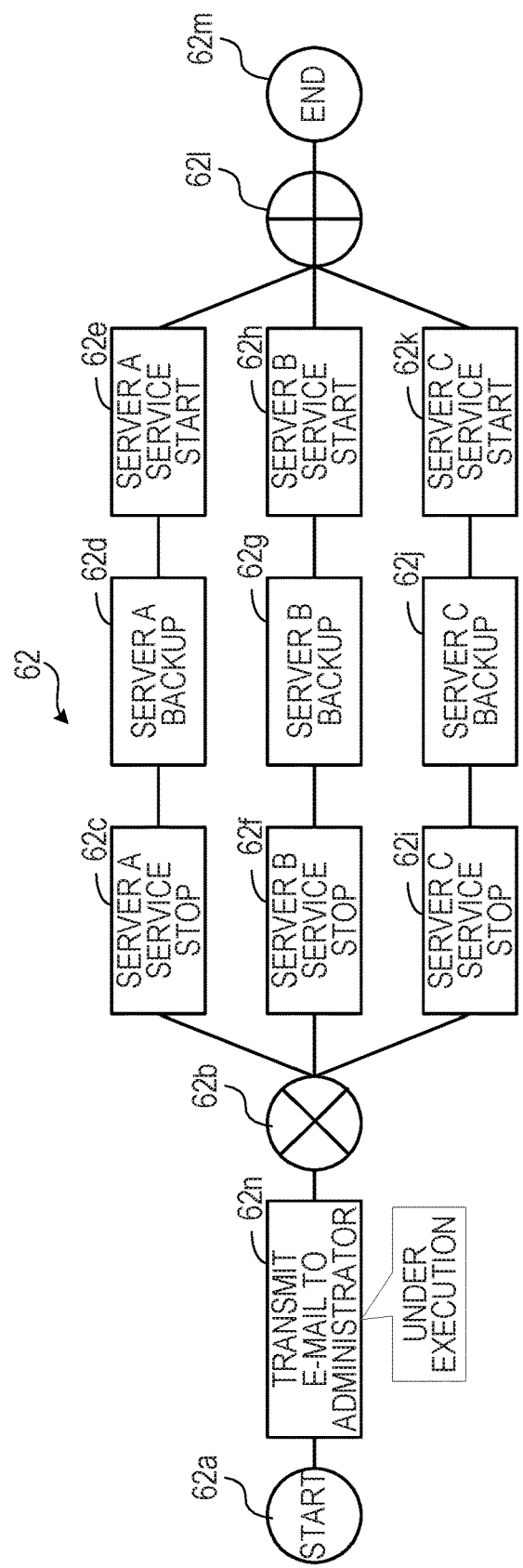
FIG. 15 is a diagram illustrating an example of a process definition.

FIG. 15 is a diagram illustrating an example of a process definition. A process definition 62 illustrated in FIG. 15 has nodes 62a to 62m similar to the nodes 61a to 61m in the process definition 61 illustrated in FIG. 6, and a node 62n interposed between a start node 62a and a parallel execution start node 62b. The node 62n represents an operation manipulation to transmit an e-mail informing an administrator of execution of backup before executing data backup of the servers 31 to 33.

When such a process definition 62 begins to be executed, it is assumed that abnormality occurs in the server 33 having the server name "server C" during execution of an operation manipulation corresponding to the node 62n. In this case, when the abnormality is detected by the monitoring unit 51 of the monitoring device 50, the management server 100 is informed of the abnormality. Thus, the server configuration information 111 is updated by the configuration information manager 131 of the management server 100. For example, as in the server configuration information 111 illustrated in FIG. 5, available_flag of "server C" is changed to "FALSE".

The process definition controller 132 refers to the server configuration information 111 to recognize that "server C" become unavailable. Then, the process definition controller 132 generates an alternate process definition on the basis of the process definition 62 being currently executed.

FIG. 16 is a diagram illustrating an example of process definition information indicating a process definition under execution when abnormality is detected. Process definition information 121b has, for example, a data structure in a table format. In the example of FIG. 16, the status of a node having a node ID "1" is "completed", the status of a node having a node ID "2" is "executing", and the status of each of nodes having respective node IDs "3" to "14" is "waiting".

Under such conditions, when an abnormality of "server C" is detected, it is first checked that a node being currently executed is not a node within the parallel execution section and a node to be executed next is also not a node within the parallel execution section. In the example of FIG. 16, the node (node ID "2") being executed is not set with a parallel execution start node ID and a parallel execution end node ID, and thus the node is not a node within the parallel execution section. In addition, node ID "3" is set in the subsequent node ID list of the node being executed, and thus a node having a node ID "3" is a node to be executed next. The node to be executed next is also not set with a parallel execution start node ID and a parallel execution end node ID. Therefore, the node to be executed next is also not a node within the parallel execution section. Accordingly, an alternate process definition is generated.

In generating the alternate process definition, among the nodes described in the process definition information 121b, a node taking an unavailable server as a target server and other nodes within the same parallel execution section as the node are set as exclusion candidate nodes. When the status of each of the exclusion candidate nodes is "waiting", the exclusion candidate nodes are deleted. In the example of FIG. 16, nodes having node IDs "10" to "12" are deleted. At this time, node IDs of the deleted nodes are deleted from antecedent node ID lists and subsequent node ID lists of each node.

In this way, an alternate process definition is generated.

Figure 17:
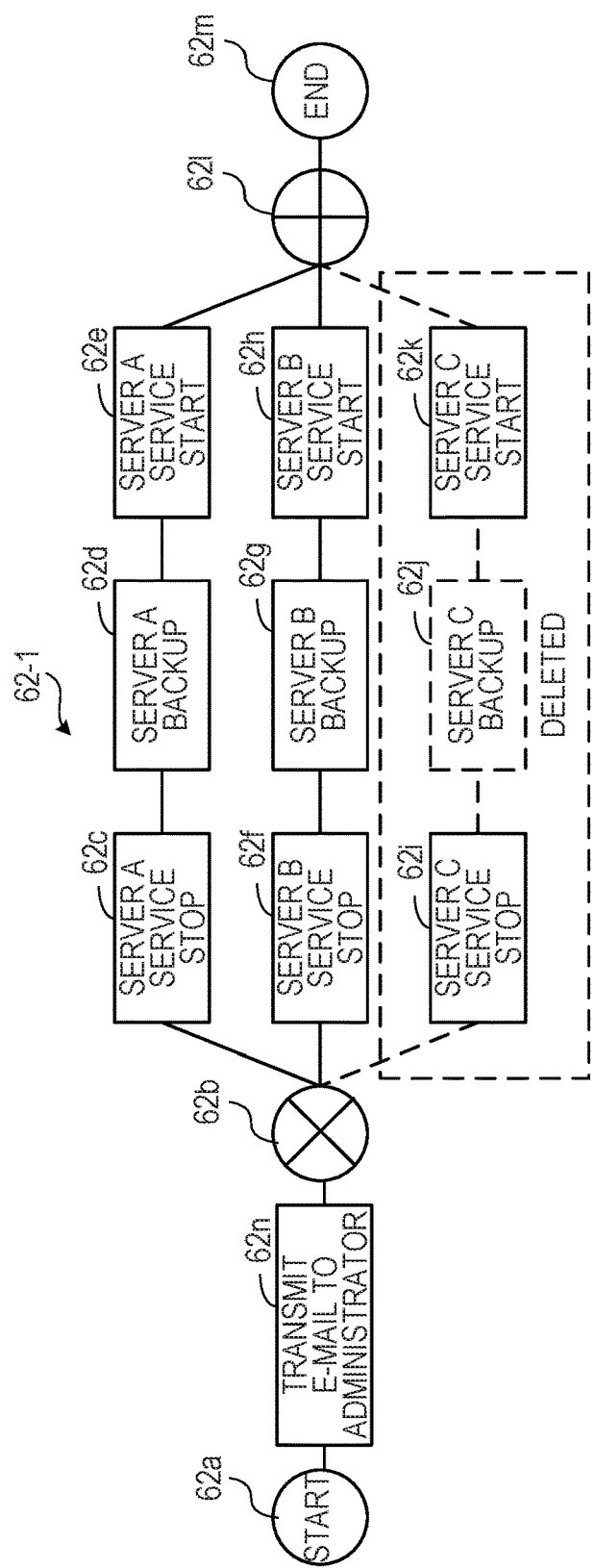
FIG. 17 is a diagram illustrating an example of an alternate process definition.

FIG. 17 is a diagram illustrating an example of an alternate process definition. In an alternate process definition 62-1, the nodes 62i to 62k are deleted from the process definition 62 illustrated in FIG. 15.

FIG. 18 is a diagram illustrating an example of process definition information indicating an alternate process definition. As illustrated in FIG. 18, the status set in the original process definition information 121b is passed over to process definition information 121c of an alternate process definition. When the alternate process definition 62-1 is executed on the basis of the process definition information 121c, operation manipulations are executed in an order from the next node (a node registered in the subsequent node ID list of a node being executed) after the status of the node being executed becomes "completed". In the example of FIG. 18, when the status of a node having node ID "2" becomes "completed", an operation manipulation corresponding to a node having node ID "3" is executed. Thereafter, operation manipulations of nodes in "waiting" are executed in an order indicated in the alternate process definition 62-1.

When the alternate process definition 62-1 is generated, a re-execution process definition is also generated.

Figure 19:
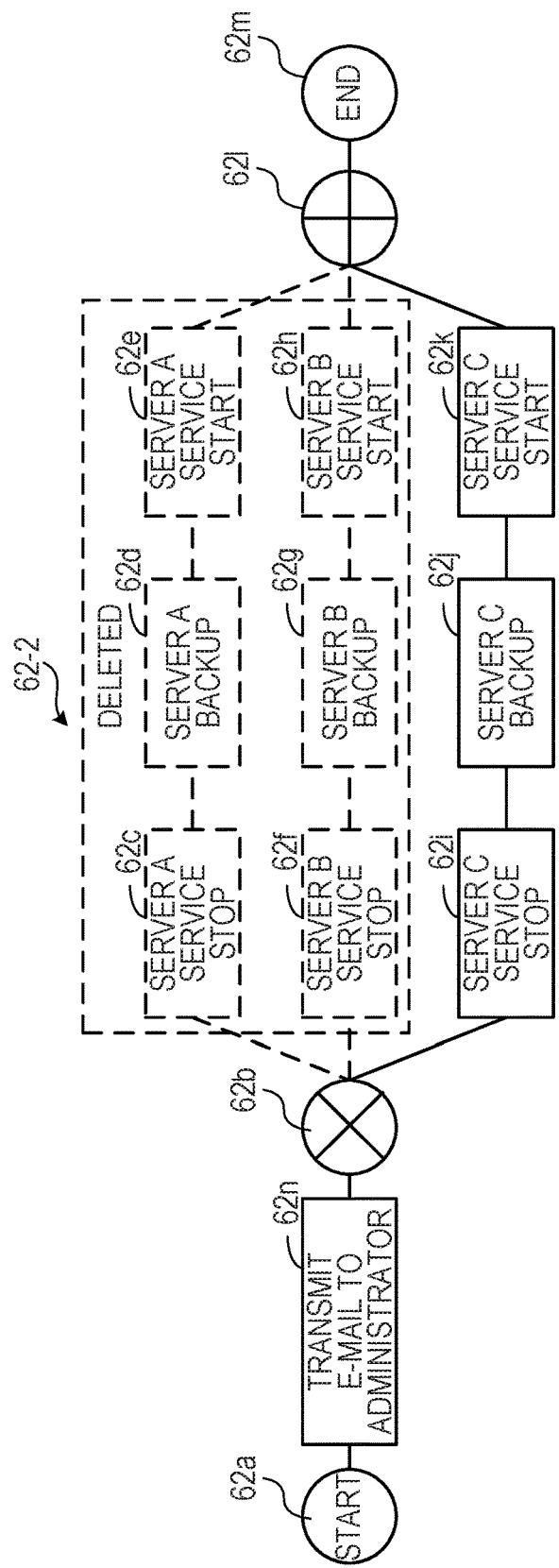
FIG. 19 is a diagram illustrating an example of a re-execution process definition.

FIG. 19 is a diagram illustrating an example of a re-execution process definition. In a re-execution process definition 62-2, the nodes 62c to 62h are deleted from the process definition 62 illustrated in FIG. 15.

In this way, when an abnormality of a server is detected during execution of a process definition, the alternate process definition 62-1 excluding a parallel execution section including a node taking the server as a manipulation target is generated. Then, the alternate process definition 62-1 may be used to continue operation manipulations. Further, for the parallel execution section excluded from the alternate process definition 62-1, the re-execution process definition 62-2 may be used to execute operation manipulations after the abnormal server becomes available.

As described above, according to the second embodiment, in executing operation manipulations in parallel for a plurality of servers, even when some servers to be manipulated are unavailable, it is still possible to execute operation manipulations while avoiding manipulations for the unavailable servers. As a result, even if an abnormality occurs in some servers, since executions of the entire process definitions taking the plurality of servers as manipulation targets are not stopped, it is possible to improve the efficiency of the execution of operation manipulations. Further, since a number of process definitions for a single server are not required to be prepared for operations against with an abnormality, a burden of an administrator may be reduced. Moreover, even when the number of servers increases, since the number of process definitions to be generated may be suppressed, it is possible to reduce the amount of system resources to be used and thus improve maintainability.

Moreover, since operation manipulations may be automatically executed only for minimal machines when the operation manipulations are re-executed, it is possible to decrease the number of machines occupied in the re-execution. As a result, it is possible to save machine resources used in the re-execution and thus execute operation manipulations with high efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A non-transitory computer-readable recording medium storing therein a program that causes a computer to execute a process, the process comprising:
storing, in a memory, an operation scenario that defines an order of a plurality of operations and a plurality of parallel operations collectively executed by a plurality of servers in a computer system in which each of the plurality of parallel operations is executed in parallel with another operation of the plurality of operations;

monitoring a status of each of the plurality of servers to obtain information regarding whether each of the plurality of servers is available or unavailable;

determining an availability status of the plurality of servers and acquiring, based on a result of the determining, availability information indicating whether an unavailable server exists among the plurality of servers;

retrieving the operation scenario stored in the memory, and generating execution determination information based on the operation scenario retrieved from the memory and the availability status of the plurality of servers when the availability information indicates existence of the unavailable server, the execution determination information indicating a determination of whether each of the plurality of parallel operations will be executed or not based on the availability status of the plurality of servers;

generating an alternate operation scenario by excluding, from the execution determination information generated in advance of the generating of the alternate operation scenario, one or more parallel operations determined not to be executed based on the execution determination information generated in advance, the generating of the alternate operations scenario being performed only when execution of the plurality of parallel operations does not begin to be performed;

generating a secondary alternate operation scenario which is obtained by excluding one or more of the parallel operations determined to be executed based on the execution determination information; and executing the alternate operation scenario thereby automatically excluding the one or more parallel operations determined not to be executed.

2. The non-transitory computer-readable recording medium according to claim 1, wherein the execution determination information indicates that execution of a parallel operation having an antecedent dependency with another parallel operation scheduled to be executed by the unavailable server is also suppressed in addition to the another parallel operation.

3. The non-transitory computer-readable recording medium according to claim 1, the process comprising generating the alternate operation scenario when execution of the operation scenario has begun.

4. An operation management method, comprising:

storing, in a memory, an operation scenario that defines an order of a plurality of operations and a plurality of parallel operations collectively executed by a plurality of servers in a computer system in which each of the plurality of parallel operations is executed in parallel with another operation of the plurality of operations;

monitoring a status of each of the plurality of servers to obtain information regarding whether each of the plurality of servers is available or unavailable;

determining an availability status of the plurality of servers and acquiring, based on a result of the determining, availability information indicating whether an unavailable server exists among the plurality of servers;

retrieving the operation scenario stored in the memory, and generating execution determination information based on the operation scenario retrieved from the memory and the availability status of the plurality of servers when the availability information indicates existence of the unavailable server, the execution determination information indicating a determination of whether each of the plurality of parallel operations will be executed or not based on the availability status of the plurality of servers;

generating an alternate operation scenario by excluding, from the execution determination information generated in advance of the generating of the alternate operation scenario, one or more parallel operations determined not to be executed based on the execution determination information generated in advance, the generating of the alternate operations scenario being performed only when execution of the plurality of parallel operations does not begin to be performed;

generating a secondary alternate operation scenario which is obtained by excluding one or more of the parallel operations determined to be executed based on the execution determination information; and executing the alternate operation scenario thereby automatically excluding the one or more parallel operations determined not to be executed.

5. An operation management apparatus, comprising:

a memory storing an operation scenario that defines an order of a plurality of operations and a plurality of parallel operations collectively executed by a plurality of servers in a computer system in which each of the plurality of parallel operations is executed in parallel with another operation of the plurality of operations; and a processor coupled to the memory and configured to:

monitor a status of each of the plurality of servers to obtain information regarding whether each of the plurality of servers is available or unavailable, determine an availability status of the plurality of servers and acquire availability information indicating whether an unavailable server exists among the plurality of servers, retrieve the operation scenario stored in the memory, and generate execution determination information based on the operation scenario retrieved from the memory and the availability status of the plurality of servers when the availability information indicates existence of the unavailable server, the execution determination information indicating a determination of whether each of the plurality of parallel operations will be executed or not based on the availability status of the plurality of servers, generate an alternate operation scenario by excluding, from the execution determination information generated in advance of the generating of the alternate operation scenario, one or more parallel operations determined not to be executed based on the execution determination information generated in advance, the generating of the alternate operations scenario being performed only when execution of the plurality of parallel operations does not begin to be performed, generating a secondary alternate operation scenario which is obtained by excluding one or more of the parallel operations determined to be executed based on the execution determination information, and execute the alternate operation scenario thereby automatically excluding the one or more parallel operations determined not to be executed.

* * * * *